Sept. 5, 1961 T. E. DUGLE ET AL 2,998,759
AUTOMATIC TRACING DEVICE
Original Filed July 13, 1955 9 Sheets-Sheet 2
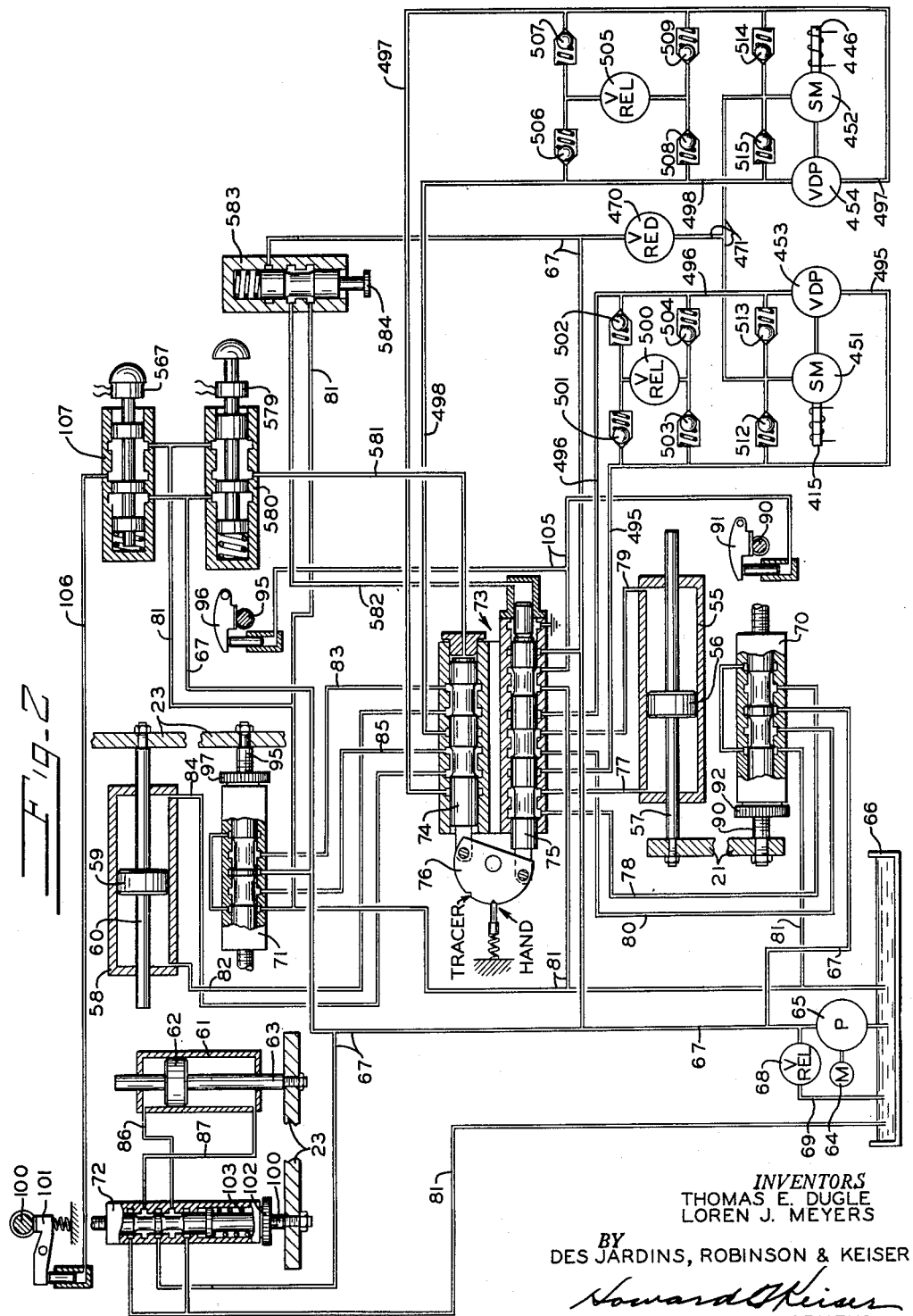
INVENTORS
THOMAS E. DUGLE
LOREN J. MEYERS
BY
DES JARDINS, ROBINSON & KEISER
THEIR ATTORNEYS

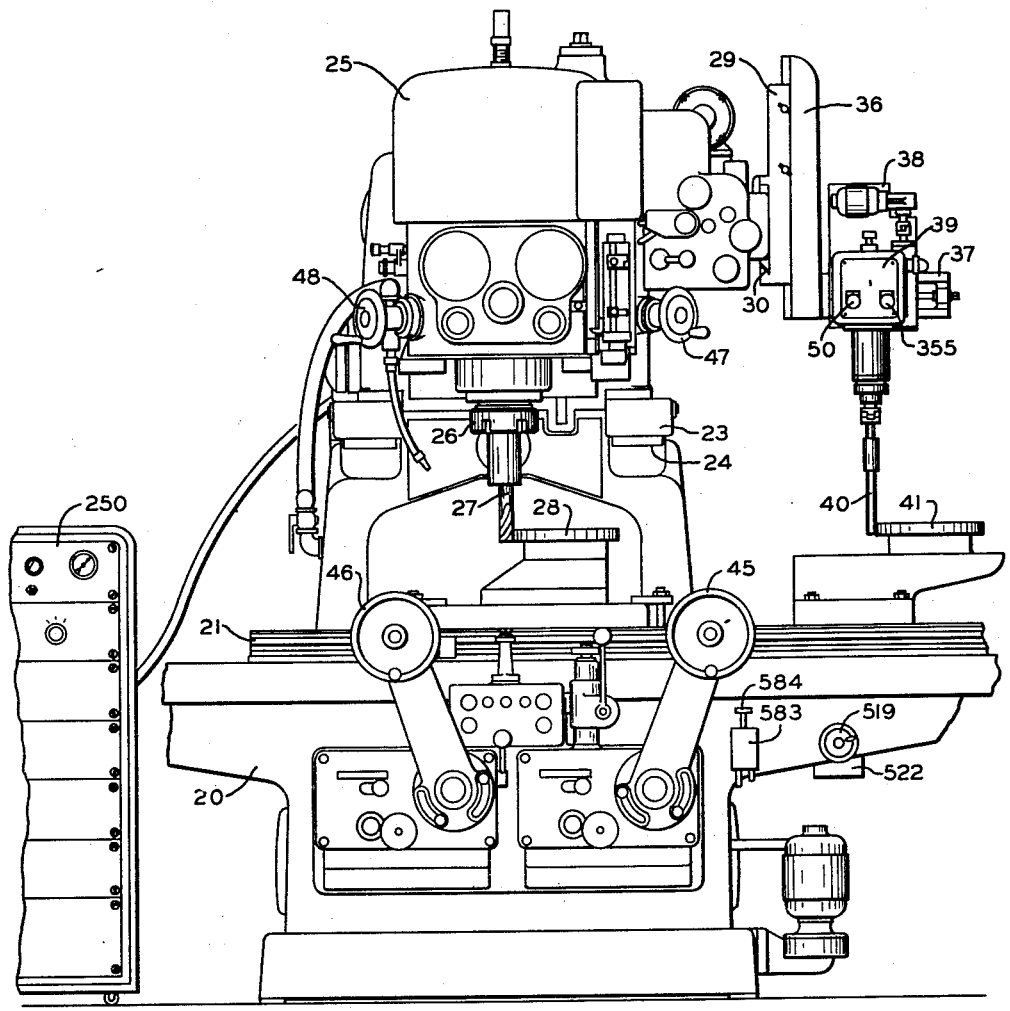

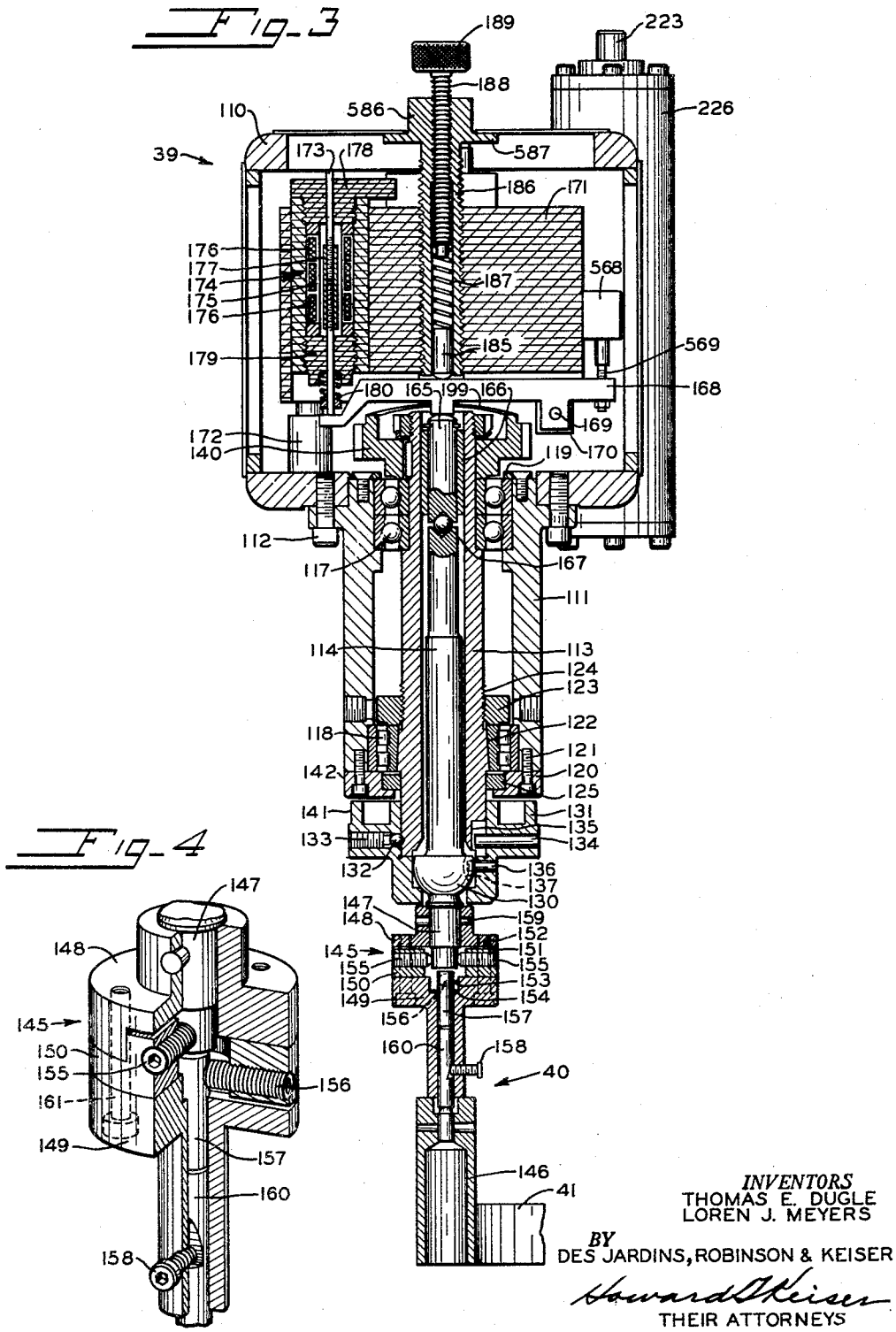

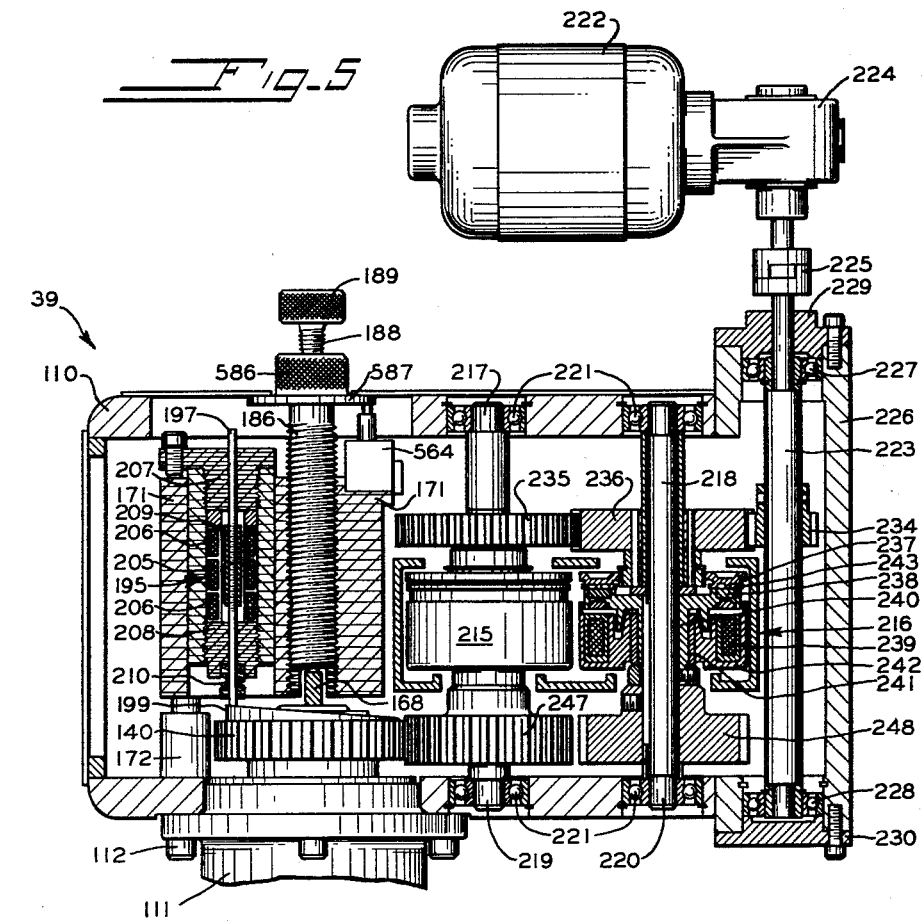
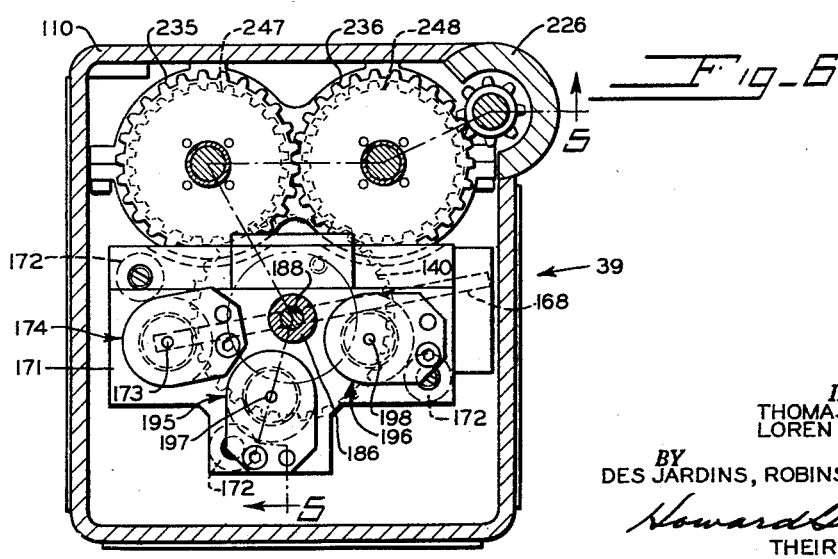

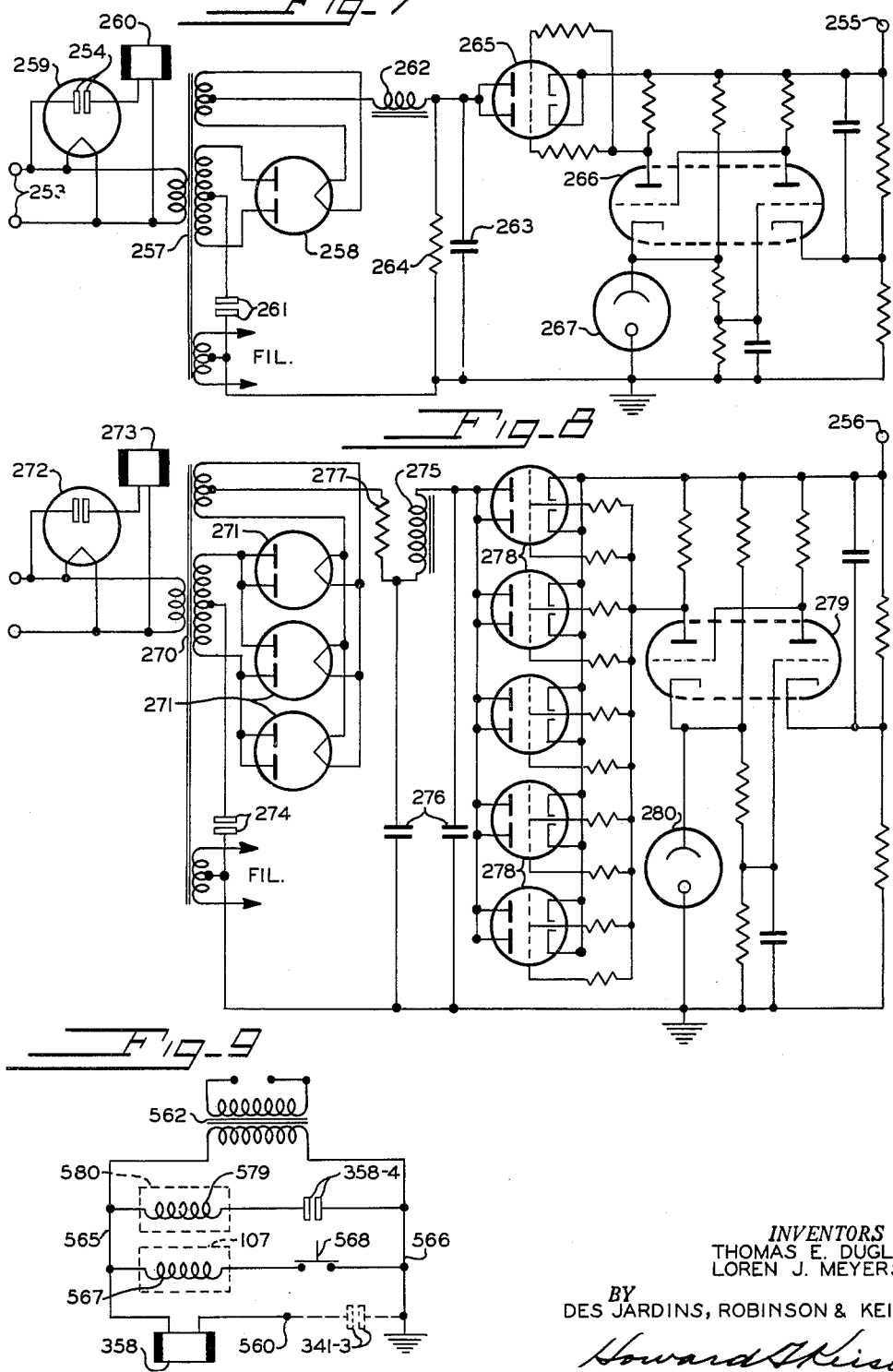

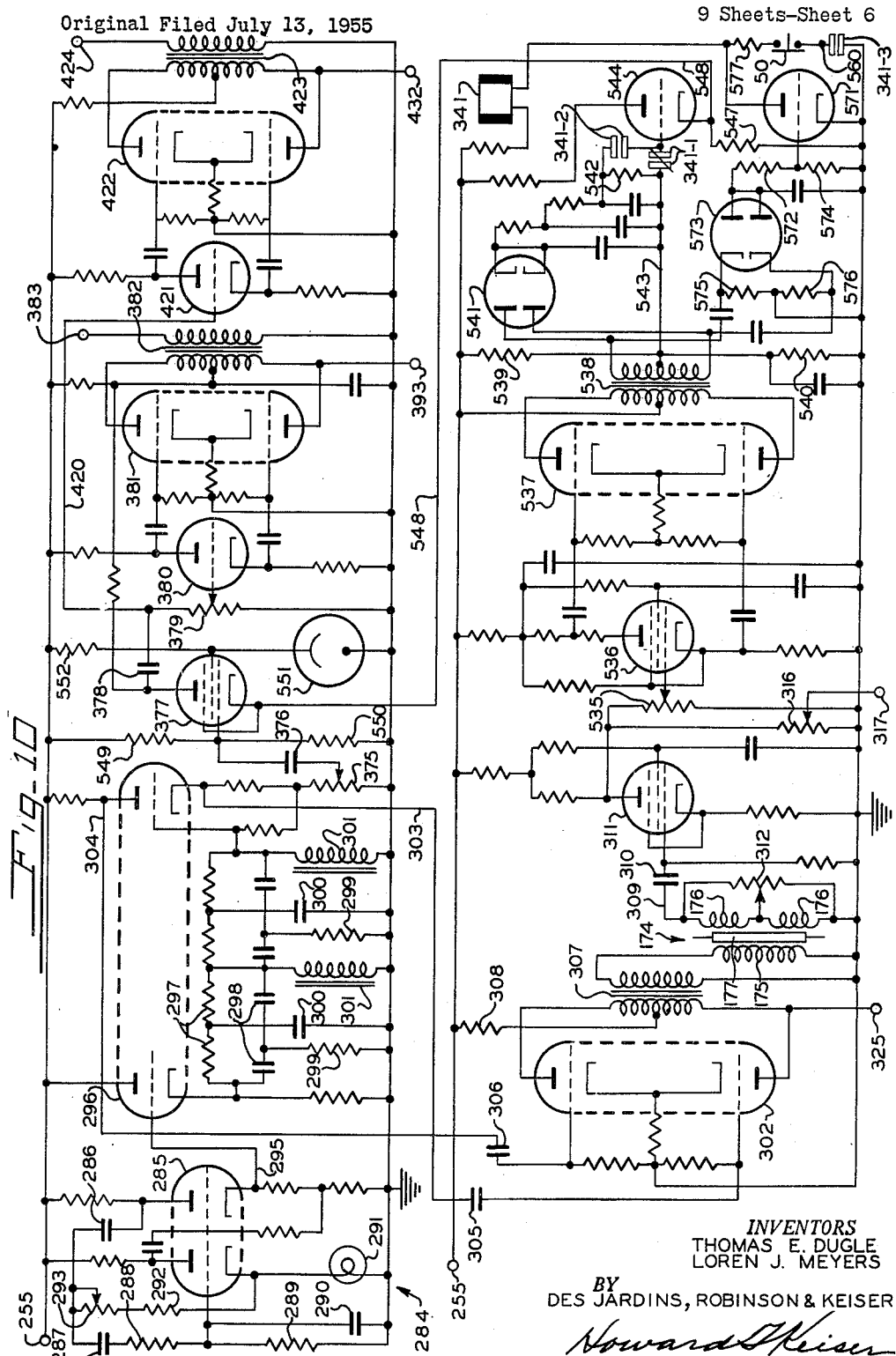

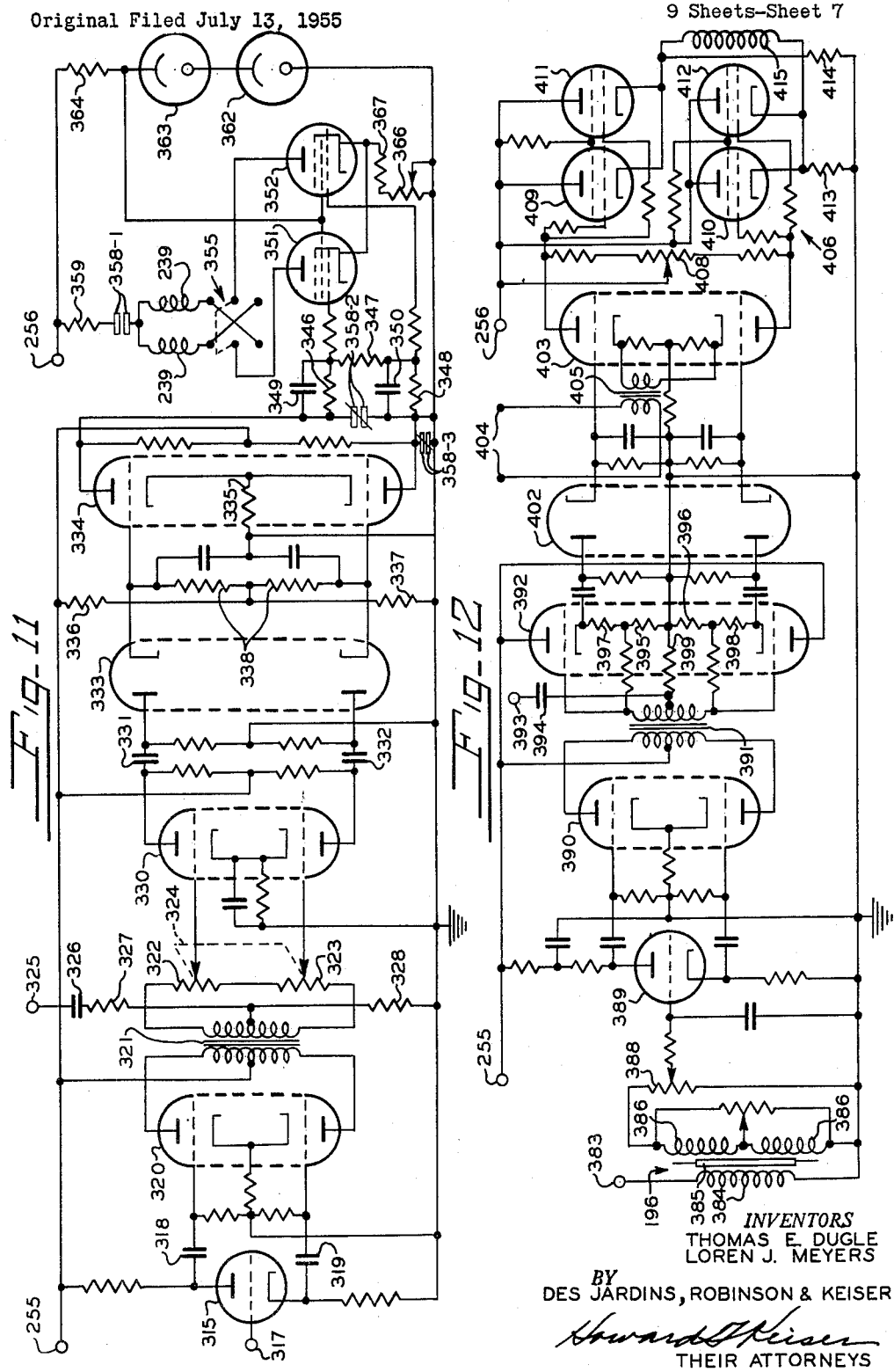

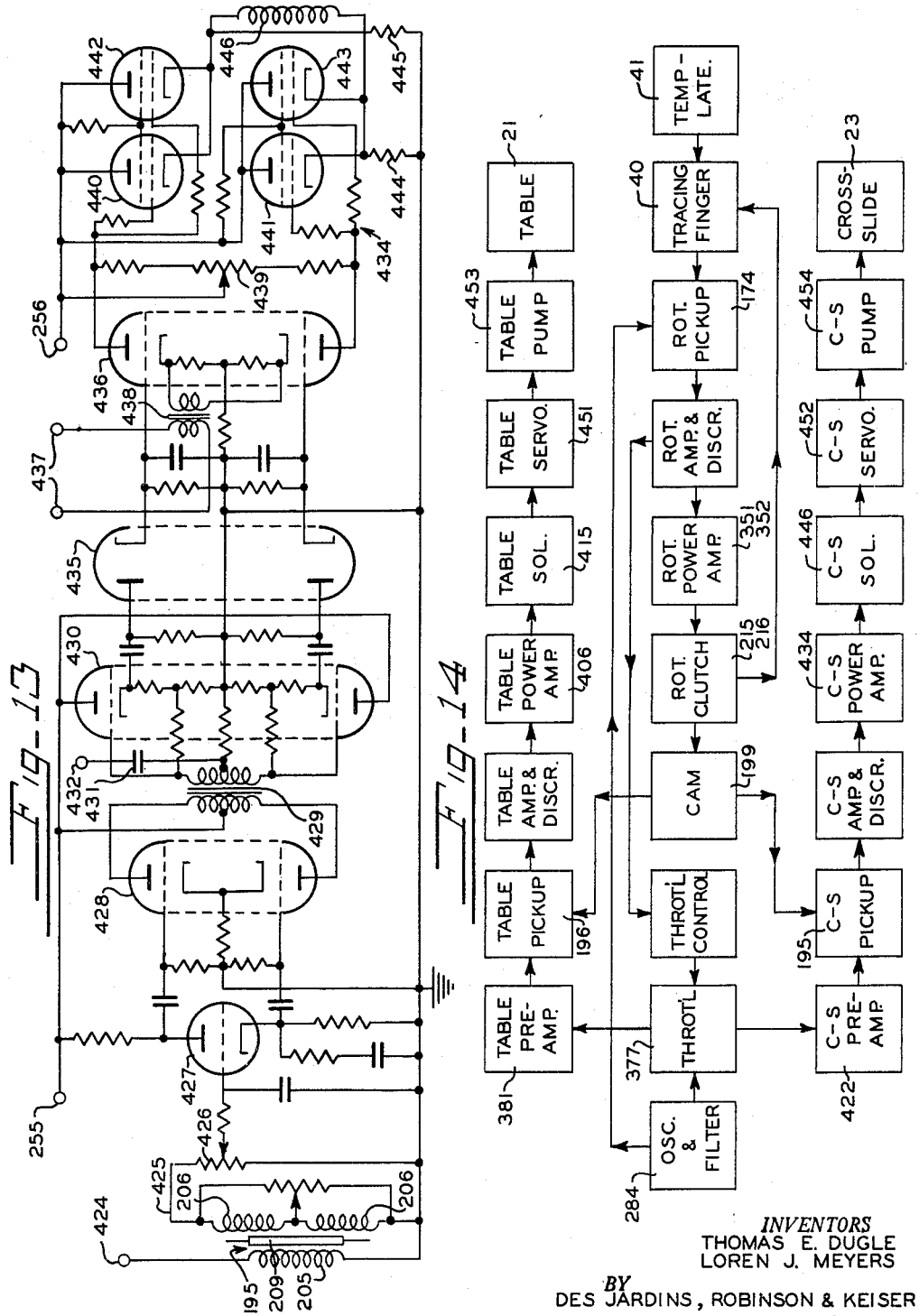

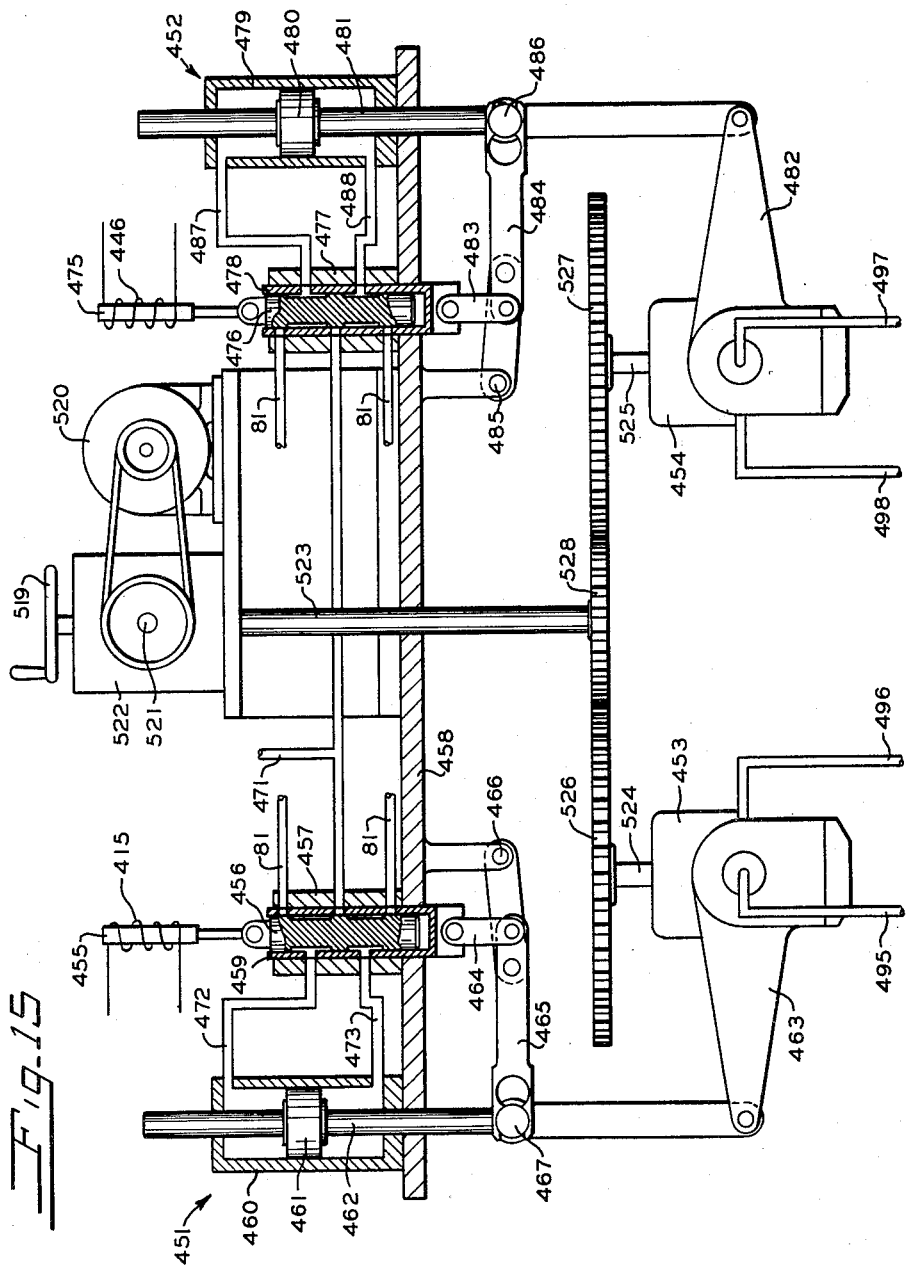

United States Patent Office 2,998,759
Patented Sept. 5, 1961

2,998,759
AUTOMATIC TRACING DEVICE
Thomas E. Dugle, Cincinnati, Ohio, and Loren J. Meyers, Garden Grove, Calif., assignors, by mesne assignments, to The Cincinnati Milling Machine Co., Cincinnati, Ohio, a corporation of Ohio
Application Sept. 11, 1958, Ser. No. 761,277, now Patent No. 2,949,739, dated Aug. 23, 1960, which is a continuation of application Ser. No. 521,795, July 13, 1955, now abandoned. Divided and this application Mar. 21, 1960, Ser. No. 17,240
3 Claims. (Cl. 90—62)

This application is a division of our co-pending patent application, Serial No. 761,277, filed September 11, 1958 for an Automatic Tracing Device, now Patent 2,949,739, issued August 23, 1960. The latter application is a continuation of application, Serial No. 521,795, filed by us on July 13, 1955, and now abandoned.

The present invention relates to a tracer control mechanism of the type in which a finger or stylus is automatically caused to follow the outline of a pattern through a full 360 degrees of movement of the finger relative to the pattern. More specifically, the invention comprises an electric pickup type of tracer which is adapted to produce an error signal whenever the tracer deviates from the pattern outline. This signal is then utilized to control the hydraulic actuators of the machine and return the tracer to the pattern outline. The tracer control mechanism may be applied to any desired type of reproducing apparatus which is designed for hydraulic operation. For example, it may be used to control the operation of an automatic profiling machine in which one or more pieces of work are simultaneously contoured to conform to the outline of a master templet or pattern. The form of apparatus constituting the present invention provides certain advantages over the prior art forms of tracer mechanisms and has been designed with a view to enabling rapid and efficient reproduction of the master in the workpieces. This is made possible by the use of electrical controls which provide rapid and accurate response to changes in direction of the pattern outline and to apply these controls to the electrohydraulic devices which in turn control the hydraulic actuators of the machine.

In general, the present invention comprises a tracing finger which is mounted for rotation about its longitudinal axis so as to permit the use of eccentricity or anticipation in the system, and also for rotation about a lateral axis so as to permit sidewise deflection of the finger by the pattern. The sidewise deflection of the finger operates an electrical pickup of the differential transformer type which produces a null signal when the tracer is following the pattern outline and an error signal when the tracer departs therefrom. The phase of the error signal is indicative of the overdeflection and underdeflection of the finger by the pattern. This signal is fed into a discriminator circuit and rectified so as to produce a direct current voltage whose polarity is dependent on the phase of the error signal. This voltage is then amplified and utilized to control the engagement of a pair of magnetic clutches which afford a reversible drive to the gear which rotates the finger about its longitudinal axis. This gear carries a sine-cosine cam which adjusts the armatures of a pair of variable differential transformers which are spaced 90 degrees apart around the cam. Hence, the voltage produced by one transformer will vary as the sine of the angular displacement of the cam while the other voltage will vary as the cosine thereof. These voltages are amplified with care being taken to maintain the linearity of the voltages throughout the various circuits so as to preserve the sine-cosine relationship between the voltages. The amplified voltages are then applied to the servo motors which in turn control the displacement of a pair of variable displacement pumps which control the rate and direction of movement of the hydraulically operated, transversely movable slides of the machine. Since the vector sum of the sine and cosine components always remains the same regardless of the position of the cam which turns with the tracing finger, and since the response of the system to and including the variable displacement pumps is linear, the feed rate of the cutting tool of the machine, and also of the tracer, will remain the same in all directions of travel. The correction applied by the error signal to the rotational position of the cam and finger is always such as to reduce the over or underdeflection of the tracing finger thereby causing the tracer to follow the direction of the pattern outline. Likewise, the rotational position of the finger and cam are always indicative of the direction of travel of the cutting tool and tracing finger relative to the work and to the pattern.

Means is also provided for reducing the magnitude of the sine and cosine voltages when the error signal exceeds a predetermined value so as to reduce the feed rate of the cutter when sudden changes in direction are encountered such as, for example, a right-angle corner on the pattern. This reduction of the magnitude of the sine and cosine voltages will reduce the error which would otherwise occur under such circumstances due to the inability of the machine to respond with sufficient rapidity to abrupt changes in direction of the pattern outline.

A variable speed drive is also provided for the variable displacement pumps so that the feed rate of the machine may be adjusted to suit the requirements of the work by simply increasing or decreasing the speed of the pumps. This is a decidedly advantageous feature inasmuch as it eliminates the low feed rate errors which normally are present in conventional forms of tracer mechanisms. It has been common practice in prior constructions to control the feed rate by varying the magnitude of displacement of the sine-cosine cam or other displacement producing means, the magnitude being reduced when a reduced feed rate is desired. This reduction of magnitude, however, greatly increases the criticalness of response of the devices controlled by the cam since the movement of these devices becomes very small in relation to the rotational movement of the cam. Hence, errors are introduced into the tracing system by the inability of the devices controlled by the cam to respond with sufficient accuracy to small rotational movements of the cam to effect the necessary control of the operating mechanism of the machine. With a system employing variable displacement pumps, the same difficulty is encountered when an attempt is made to reduce the displacement of the pumps in order to achieve reduced feed rates. By so doing, the pumps are operated around their positions of zero displacement so that the inherent mechanical errors become a greater proportion of the total displacement and are, in effect, magnified and prevent accurate operation of the tracing system at low feed rates. However, with the present system of reducing the speed of the pumps, these difficulties are avoided and the system operates with the same accuracy at low feed rates as it does at high feed rates from the standpoint of the accuracy of the pickups, servos, and pumps. Hence, the criticalness of the components of the system is avoided and the construction of the tracer control mechanism is simplified and rendered less costly than in the case of previous forms of construction.

Accordingly, it is an object of the present invention to provide a tracer control mechanism incorporating new and improved features of construction and modes of operation.

Another object of the invention is to provide a new type of tracer control mechanism for machine tools which utilizes an electric tracing head for producing electric signals to control a pair of variable displacement pumps which drive the hydraulic actuators of the machine.

Another object of the invention is to provide a novel means for causing the feed rate of the cutting tool to be automatically reduced when sudden changes of direction in the pattern outline are encountered.

Another object of the invention is to provide a hydraulically operated machine tool in which variable displacement pumps are utilized for controlling the rate and direction of travel of the cutting tool and which in turn are controlled by electric signals produced by the tracing head after being analyzed and amplified by control circuits which are designed to provide a linear response to the signals.

With these and other objects in view which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

Referring to the drawings in which like reference numerals indicate like or similar parts:

FIG. 1 is a front elevation of a milling machine to which is shown applied the tracer mechanism constituting the present invention.

FIG. 2 is a diagrammatic view showing the manner in which the present invention is connected into the hydraulic system of the milling machine.

FIG. 3 is a cross-sectional elevation of the tracing head viewed from the front.

FIG. 4 is a perspective view of the eccentric adjustment for the tracing finger.

FIG. 5 is a cross-sectional elevation of the tracing head taken along the line 5—5 in FIG. 6.

FIG. 6 is a horizontal cross-sectional view taken through the upper part of the tracing head.

FIG. 7 is a circuit diagram of a regulated power supply for delivering a constant direct current voltage to the electrical control apparatus.

FIG. 8 is a circuit diagram of another regulated power supply for delivering a constant direct current voltage to the electrical control apparatus.

FIG. 9 is a circuit diagram of a control circuit for facilitating the changeover from hand servo control to tracer control.

FIG. 10 is a circuit diagram of a portion of the electrical control apparatus for the machine including the vacuum tube oscillator, and the throttling circuit for effecting slow-down when a sharp corner is encountered.

FIG. 11 is a circuit diagram showing a portion of the rotation control apparatus.

FIG. 12 is a circuit diagram of the electrical apparatus for controlling movement of the table of the milling machine.

FIG. 13 is a circuit diagram of the electrical apparatus for controlling movement of the cross-slide of the milling machine.

FIG. 14 is a block diagram of the tracing system.

FIG. 15 is a schematic view of the variable displacement pumps and the controlling apparatus therefor.

Machine tool

In the accompanying drawings the invention forming the subject matter of the present application is shown as applied to a hydraulically actuated milling machine of a known type. It is to be realized, of course, that the inventive features of the tracer control apparatus could be used with equally satisfactory results with other types of hydraulically actuated machine tools where it is desirable to provide means for reproducing in a workpiece the shape of a master or pattern. The milling machine shown in FIG. 1 comprises a bed 20 on which a work table 21 is mounted for longitudinal sliding movement.

Supported on the bed behind the table is a cross-slide 23 which is mounted for horizontal sliding movement on ways 24 in a fore and aft direction, that is, at right angles to the direction of movement of the table 21. A tool head 25 carrying a power driven spindle 26 and cutter 27 is mounted for vertical sliding movement on the cross-slide 23 so as to provide three dimensional movement of the cutter relative to a workpiece 28 mounted on the table. On the right-hand side of the head 25 is mounted a saddle 29 which is supported for horizontal sliding movement in a fore and aft direction on the head by suitable ways 30. The saddle is provided with vertical ways on which a saddle 36 is mounted for vertical sliding movement. The saddle 36 is provided with a horizontal arm 37 on which a tracing head slide 38 is mounted for horizontal movement along the arm 37. A tracing head 39 is mounted on the slide 38 so that a tracing finger 40 depending therefrom will move in unison with the cutter 27 and follow the contour of a pattern 41 fastened to the table. Also, by virtue of the particular mounting of the tracing head 39 upon the tool head 25 just described, the tracing finger 40 may be adjusted in any direction with respect to the cutter 27 for set up purposes.

The milling machine herein illustrated is of the same general type as that shown in U.S. Patent No. 2,239,625 granted April 22, 1941 to Erwin G. Roehm and Hans Fritschi and, like the machine of that patent, is provided with means for enabling hand operation of the table, cross-slide and head. For this purpose, a hand wheel 45 is mounted on the front of the machine bed in a convenient position for manual operation to effect traversing movement of the table 21 in one direction or the other depending upon the direction of rotation of the hand wheel. This movement of the table is effected hydraulically by a hand servovalve, the plunger of which is moved in one direction or the other in accordance with the direction of rotation of the hand wheel. The valve plunger is connected with the hand wheel 45 by means of suitable gearing and a half nut operating on a feed screw in the manner described in the aforementioned patent. The cross-slide 23 may be caused to move back and forth along the ways 24 in a similar manner by suitable manipulation of a hand wheel 46 also mounted on the front of the machine bed 20. Likewise, vertical movement of the toolhead 25 may be effected by manipulation of a hand wheel 47, or a hand wheel 48, which hand wheels are geared together for a conjoint rotation. When the machine is under control of the tracer, the hand servo controls are selectively rendered ineffective to prevent misoperation of the machine.

Hydraulic circuits

The hydraulic actuators and the control apparatus therefor of the milling machine shown in FIG. 1 are illustrated diagrammatically in FIG. 2 of the drawings. As therein shown, the hydraulic actuator of the table 21 comprises a hydraulic cylinder 55 containing a piston 56 mounted on a piston rod 57 which is bolted to the table. The table may be moved in either direction by selectively controlling the flow of fluid to the opposite ends of the cylinder 55. The cross-slide 23 is operated by a similar hydraulic actuator consisting of a cylinder 58, piston 59 and piston rod 60 bolted to the cross-slide. In a like manner, the tool head 25 may be caused to move up or down on the cross-slide by means of a hydraulic cylinder 61 secured to the head and containing a piston 62 mounted on a piston rod 63 which is bolted to the cross-slide 23.

Hydraulic fluid under pressure is supplied to the above-mentioned actuators by means of a pump 65 driven by a motor 64 which draws the fluid out of a sump 66 and delivers it under pressure to a system of high pressure lines 67. Pressure in the lines 67 is maintained constant under varying demands on the system by a pressure relief valve 68 connected to the pressure side of pump 65 and having a discharge line 69 emptying into the sump 66.

The flow of high pressure fluid to the cylinders 55, 58 and 61 is controlled by hand servovalves 70, 71 and 72, respectively, when a selector valve 73 is set in the "Hand" position as shown in FIG. 2. The valve 73 includes a pair of valve plungers 74 and 75 which are connected together for simultaneous operation by means of a centrally pivoted lever 76 to which the ends of the plungers are pivotally connected. Hence, when plunger 74 is moved to the left as viewed in FIG. 2 the plunger 75 will be moved to the right, and vice versa. With the selector valve 73 positioned as shown, the left-hand end of the cylinder 55 is communicatively connected with the right-hand motor port of valve 70 by lines 77 and 78. In a like manner, the right-hand end of the cylinder 55 is communicatively connected with the left-hand motor port of valve 70 by lines 79 and 80. The center, or pressure port of the valve 70 is, of course, connected to the system of high pressure lines 67 while the exhaust ports of the valve are connected to a system of drain lines 81 through which the hydraulic fluid is returned to the sump 66.

In a like manner, the hand servovalve 71 for the cross-slide cylinder 58 will be effective to control the flow of fluid to and from its associated cylinder when the selector valve 73 is in the position shown. In this position of the valve, the left-hand end of cylinder 58 is communicatively connected with the right-hand motor port of valve 71 by lines 82 and 83. Likewise, the right-hand end of the cylinder is connected to the left-hand motor port by lines 84 and 85. The center, or pressure port of the valve is connected to the high pressure line 67 and the exhaust ports are connected to the drain line 81.

The hand servovalve 72 is effective to control the flow of hydraulic fluid to and from the head cylinder 61 by means of line 86 which connects the upper end of the cylinder to the bottom motor port of the valve and a line 87 which connects the lower end of the cylinder to the top motor port of the valve. The center port of the valve is connected to the high pressure line 67 and the exhaust ports thereof are connected to the drain line 81.

From the foregoing it will be clear that when the machine is set for hand operation, each of the hand servovalves 70, 71 and 72 will be rendered effective to control the flow of fluid under pressure to and from the cylinders of the hydraulic actuators. The direction of movement of the pistons within the cylinders will be dependent upon the direction of movement of the plungers of the valves which, in hand operation of the machine, is effected by hand wheels 45, 46, 47 and 48 (FIG. 1) which are connected through gearing with half nuts moving with the valve plungers. This mechanism is fully described in the previously mentioned U.S. Patent No. 2,239,625 and need not be described in detail herein except insofar as is necessary for an understanding of the manner in which the changeover is effected from hand servo control to tracer control.

Referring again to FIG. 2, the plunger of the hand servovalve 70 is bored to slidably receive a feed screw 90 which is bolted to the table 21. As diagrammatically illustrated herein, the feed screw 90 is adapted to be engaged by a half nut 91 which is carried by and moves with the plunger of the valve and is pivoted thereto for movement into or out of engagement with the feed screw 90. As described in the aforementioned patent, the plunger and half nut may be rotated by means of a gear 92 connected to the hand wheel 45 for rotation thereby. Hence, with the half nut engaged with the feed screw 90, rotation of the plunger and half nut will cause the plunger to be fed along the screw thereby admitting fluid under pressure to one end of the cylinder 55 and connecting the other end of the cylinder to drain. The resulting movement of the piston 56 will cause movement of the table 21 which in turn will center the plunger of the valve to stop further movement of the table, the body of the valve being fast on the bed of the machine. When the half nut is disengaged from the feed screw, however, the table will then be free to move with reference to the valve plunger as is necessary in operating the machine under tracer control.

The hand servovalve 71 for the cross-slide cylinder 58 is constructed and arranged in the same manner as the valve 70 just described. That is, the plunger of the valve is bored to slidably receive a feed screw 95 which is bolted to the cross-slide and adapted to be engaged by a half nut 96 pivotally supported on the plunger of the valve. Rotation of the plunger and half nut may be effected by manipulation of the hand wheel 46 (FIG. 1) which is connected by suitable gearing with a gear 97 rotating with the plunger. Hence, the cross-slide may be moved back and forth under power by suitable manipulation of the hand wheel 46 which, when the half nut 96 is engaged, causes feeding movement of the plunger of the valve along the feed screw and produces corresponding movement of the cross-slide while the hand wheel is being turned.

The servovalve 72 for the head cylinder 61 is similarly constructed. The plunger of this valve is bored to slidably receive a feed screw 100 which is adapted to be engaged by a half nut 101 pivotally supported on the valve plunger. Rotation of the plunger and half nut by the hand wheels 47 and 48 (FIG. 1) is effected by a suitable drive from the hand wheels to a gear 102 which rotates with the plunger of the valve. Therefore, with the half nut engaged, rotation of the hand wheels will cause feeding movement of the plunger along the feed screw and cause corresponding movement of the cylinder 61 relative to the cross-slide 23. For reasons later to be explained, the plunger of the valve 72 is biased upwardly by a spring 103 compressed between an offset in the valve body and a flange formed on the valve plunger. So long as the half nut 101 is engaged with the feed screw 100, however, the spring 103 is ineffective to move the valve plunger out of its centered position.

Each of the half nuts 91, 96 and 101, is normally biased into engagement with its related feed screw but may be disengaged therefrom upon the application of hydraulic pressure to a small hydraulic actuator associated with each half nut. As shown in FIG. 2, the hydraulic actuators for the half nuts 91 and 96 are connected by a line 105 with a port on the selector valve 73. This port is connected with the drain line 81 when the plunger 75 of the valve is in the position shown in FIG. 2. Hence, when the selector valve is set for hand servo operation, the half nuts will be engaged with their related feed screws. When, however, the valve 73 is shifted to "Tracer" position, a port on the selector valve connected with high pressure line 67 will be communicatively connected with the line 105 to thereby supply pressure to the actuators for the half nuts 91 and 96 and remove these half nuts from the feed screws 90 and 95. This will cause the valves 70 and 71 for the table and cross-slide to be conditioned for a tracer operation by disassociating the valve plungers from their associated feed screws so as to permit the feed screws to move within the plungers without any interference thereby during operation of the machine under the control of the tracer.

The hydraulic actuator for the half nut 101 is connected by a line 106 with a port on a solenoid valve 107. In hand servo operation, this valve is normally energized, as shown in FIG. 2, to connect the line 106 with the drain line 81 connected to another port on the valve. Accordingly, the half nut 101 will be permitted to engage its feed screw 100 to enable hand operation of the tool head 25. When the machine is set for tracer control, the same condition prevails with respect to the hand servovalve 72, i.e., the half nut 101 remains engaged with the feed screw 100 under normal conditions of operation under tracer control. This permits raising and lowering of the tool head 25 under control of hand wheels 47 and 48 during tracer control in the same manner as when the machine is set for hand servo operation.

Tracing head

When the machine heretofore described is to be used for the automatic reproduction of a master or pattern, it is placed under the control of the tracing head 39, the tracing finger 40 of which is adapted to contact the edge of the pattern 41 and to follow the outline of the pattern as the tracing operation proceeds. As shown in FIGS. 3, 4, 5 and 6 of the drawings, the tracing head 39 is mounted in a casing 110 which is in the form of a hollow box having removable top and side panels which afford access to the interior of the head. In the bottom of the casing there is provided a circular opening for receiving the upper end of a cylindrical housing 111 which is secured to the casing 110 by fastening screws 112. Rotatably journaled within the housing 111 is a sleeve 113 within which the stem 114 of the tracing finger 40 is housed. As shown in FIG. 3, the sleeve 113 is journaled for rotation within the housing 111 by an upper set of ball bearings 117 and a lower set of roller bearings 118. The ball bearings 117 are retained within a recess provided in the upper end of the housing 111 by a retaining ring 119 which is held in place on the upper end of the housing by suitable fastening screws. The roller bearings 118 are retained within a recess provided in the lower end of the housing by a bottom cap 120 which is fastened to the bottom of the housing by screws 121. The sleeve 113 is provided toward its lower end with a taper 122 which is adapted to engage a similar taper formed on the inner race of the roller bearing 118, the taper 122 being seated therein and held thus engaged by a draw nut 123 meshing with a screw thread 124 provided on the sleeve just above the taper 122. The interior of the housing 111 is sealed against the entrance of dust and dirt by a ring or gasket 125 of synthetic rubber or similar material which also serves as an oil seal between the lower end of the housing and the sleeve 113.

Near its lower end, the stem 114 is provided with a spherical prominence 130 which seats in a counterbore formed in the lower end of a pivot ring 131 which is securely fastened to the bottom of the sleeve 113 by a ball 132 forced into a V-shaped groove in the sleeve by a set screw 133 in the ring and a locating pin 134 in the ring which projects into a groove 135 formed in the sleeve. The stem 114 is constrained to rotate with the sleeve 113 due to the engagement of the inner end of a pin 136 in the ring engaging with a groove 137 formed in the ball pivot 130. Rotation of the sleeve and stem is effected by means of a spur gear 140 mounted upon and keyed to the upper end of the sleeve 113. If desired, a degree scale may be inscribed on the peripheral face 141 of the ring 131 so that the angular position of the tracing finger with relation to the housing 111 of the tracing head may be determined by reading the scale against an index line inscribed on the peripheral face 142 of the cap 120. Also, a portion of the face 141 is preferably knurled so as to facilitate turning the ring 131 by hand for a purpose later to be described.

Eccentricity of the lower end of the tracing finger 40 with respect to the axis of rotation of the sleeve 113 is provided for by a coupler 145 which serves to connect a cylindrical contact element 146 of the tracing finger with a shank 147 formed on the bottom of the stem 114. The coupler 145 includes a top slide 148, a bottom slide 149 and a cross block 150. The cross block is provided on its upper surface with a feather 151 which is slidable within a groove 152 formed in the upper slide 148. The block 150 is provided on its lower surface with a feather 153 lying at right angles to the feather 151 and slidably received within a groove 154 in the bottom slide 149. The assembly is held together by longitudinally extending screws 161.

The block 150 is provided with an upper pair of oppositely disposed adjustment screws 155 adapted to bear against opposite sides of the shank 147 and also with a lower pair of adjustment screws 156 disposed at right angles to the screws 155 and adapted to bear against opposite sides of a dowel pin 157 mounted in the bottom slide 149. Also carried by the slide 149 is a pin 160 on the lower end of which the contact element 146 is fastened. The pin is secured to the bottom slide 149 by a set screw 158 and the upper slide 148 is secured to the shank 147 by a pin 159. Hence, by suitable adjustment of the screws 155 and 156, the contact element 146 may be offset in any direction from the central axis of the stem 114 so that eccentricity may be introduced in any desired direction.

As is well known in the art, it is desirable to offset the contact element in the direction of tracing so as to provide a certain amount of anticipation to compensate for the time lag in the response of the system to changes in direction of the pattern. Eccentricity of the contact element with respect to its axis of rotation also introduces a certain amount of feed back into the system since it tends to reduce the error signal in response to the applied correction. This, as is well known, tends to increase the stability of operation of the system.

Sidewise deflection of the element 146 by the edge of the pattern 41 is translated into vertical movement of a plunger 165 slidably mounted within a bushing 166 inserted in the upper end of the sleeve 113 by means of a ball 167 which seats in conical recesses provided in the top and bottom of the stem 114 and plunger 165, respectively. The upper end of the plunger 165 bears against the bottom of a lever 168 which is pivoted at 169 between a pair of brackets 170 secured to the bottom face of a laminated phenolic body 171 supported on the bottom of the casing 110 by three posts 172. As shown in FIG. 3, the left-hand end of the lever 168 lies beneath the lower end of a plunger 173 of a linear variable differential transformer 174 which includes a primary winding 175, a pair of secondary windings 176 and a magnetic core 177 carried by the plunger 173 for axial movement relative to the primary and secondary windings of the transformer. The plunger 173 is journaled for sliding movement in upper and lower threaded plugs 178 and 179, respectively, which retain the windings of the transformer in position within the bore into which the plugs are screwed. A compression spring 180 compressed between the bottom of a bore in the plug 179 and an abutment flange on the plunger 173 urges the bottom end of the plunger into contact with the top edge of the lever 168.

A predetermined amount of downward pressure may be applied to the plunger 165 by means of a spring pressed plunger 185 which is slidably mounted within an externally threaded sleeve 186 which screws into a threaded hole provided in the body 171. The plunger 185 is located in axial alignment with the plunger 165 and is pressed downwardly by a spring 187 which is compressed between the top of the plunger 185 and the lower end of a screw 188 which screws into the upper end of the sleeve 186. Screw 188 is provided with a knurled head 189 whereby the screw may be turned to adjust the compressive force of the spring 187 against the plunger 186 so that a predetermined sidewise force must be applied to the contact element 146 to produce deflection of the stem 114 and elevation of the plunger 173 of the differential transformer 174.

As will be more fully explained hereinafter, the differential transformer 174 operates to produce an electric signal which may appropriately be referred to as an "error" signal whenever the tracing finger 40 departs from its position of normal deflection. The tracing head 39 is provided with two additional linear variable differential transformers 195 and 196 (FIG. 6) which will hereinafter be referred to as the sine and cosine transformers or pickups since they are so arranged as to produce a pair of A.C. voltages whose amplitudes vary as the sine and cosine functions of the rotational position of the tracing finger 40, and whose phase shift is determined by the algebraic sign of the sine-cosine functions. As will be observed from FIG. 6, the last mentioned transformers are so mounted in the body 171 as to lie 90 degrees apart about the central axis of the rotatable sleeve 113. The transformers 195 and 196 are provided with plungers 197 and 198, respectively, which bear at their lower ends against a sine-cosine cam 199 (FIG. 5) formed on the upper face of the gear 140. The cam 199 is so shaped as to provide a vertical displacement of the plungers 197 and 198 which varies as the sine and cosine functions of the angular position of the gear 140.

Inasmuch as the transformers 195 and 196 are of identical construction, it will be necessary to show and describe only one of them for a complete understanding of the invention. As shown in FIG. 5, the transformer 195 includes a primary winding 205 and a pair of secondary windings 206 which windings are of cylindrcal form and are received within a bore within which they are retained by upper and lower threaded plugs 207 and 208, respectively. The plugs are centrally apertured to receive the plunger 197 and serve to guide the plunger for axial movement relative to the windings. The plunger carries a magnetic core 209 which may be moved by the plunger in one direction or another from a centered or null position. A light compression spring 210 surrounds the lower end of the plunger 197 and urges the plunger downwardly against the face of the cam 199. The purpose and mode of operation of the sine-cosine transformers will be described in a later portion of the specification.

The rotational position of the tracing finger 40 is effected through the gear 140 by means of a pair of magnetic clutches 215 and 216 (FIG. 5) which are located within the casing 110 of the tracing head. Power is provided for driving the clutches by an electric motor 222 supported on the plate 38 (FIG. 1) which drives a shaft 223 through suitable reduction gearing 224 and a drive coupling 225. The shaft 223 is supported for rotation within a cylindrical housing 226, mounted on one corner of the casing 110, by means of upper and lower ball bearings 227 and 228 which are retained and enclosed by upper and lower bearing caps 229 and 230, respectively. The shaft 223 carries a pinion gear 234 which is pinned or otherwise keyed to the shaft and which drives a pair of meshing spur gears 235 and 236 journaled for rotation on shafts 217 and 218, respectively, which in turn are journaled for rotation in the casing 110 by ball bearings 221.

As shown by the cross-sectional representation of the clutch 216, each of the magnetic clutches includes a floating armature disc 237, a rotor 238 and a stationary field coil 239. The floating armature disc 237 is constrained to rotate with the driving gear 236 while being free to move through a limited distance axially of the gear. The rotor 238 is rigidly secured to the shaft 218 and forms a part of the magnetic circuit created by the stationary field coil 239 when the latter is energized. The field coil 239 is enclosed in a housing 242 which is journaled by a bushing 241 on a sleeve 240 formed integrally with the rotor 238. The magnetic clutches 215 and 216 are of a commercially available type and the detailed features of construction thereof are not important insofar as the present invention is concerned.

Engagement of each of the clutches is effected by energization of its field coil 239 which sets up a magnetic flux through the rotor and armature disc of the clutch which attracts the armature disc to the rotor and causes the mating faces 243 thereof to be frictionally engaged thereby causing the rotor to be driven by the driving gear. Keyed to the shafts 217 and 218 are spur gears 247 and 248 each of which meshes with the spur gear 140 (FIG. 6). Since the driving gears 235 and 236 are rotated in opposite directions, the gear 140 will be driven in one direction or the other depending upon which of the clutches 215 or 216 is energized to the greater degree as determined by the phase of the error signal produced by the differential transformer 174. The operation of the clutches under the control of this transformer will be fully described in a later portion of this specification.

*D.C. power supplies*

The electronic control equipment for the tracer which is shown in FIGS. 10, 11, 12 and 13, and which is housed in an electrical cabinet 250 (FIG. 1), requires a source of constant D.C. voltage in order to insure linear amplification and handling of the signals supplied thereto by the differential transformers in the tracing head. For this purpose, the regulated power supplies shown in FIGS. 7 and 8 of the drawings are provided. The supply shown in FIG. 7 provides approximately 300 volts D.C. at the plate voltage supply terminal 255 while the supply shown in FIG. 8 is intended to provide a source of approximately 400 volts D.C. at the terminal 256 for the direct current amplifier circuits of the control apparatus.

The power supply shown in FIG. 7 includes a power transformer 257 having a primary winding adapted to be connected by terminals 253 to the power line, and a center-tapped secondary winding for operating the plates of a full-wave rectifier tube 258. In order to provide a delay to allow the filaments of the vacuum tubes of the electronic circuits to heat up before plate voltage is applied thereto, a thermostatic type delay relay 259 has its heater connected in parallel with the primary winding of the transformer so as to cause the normally open contacts 254 of the relay to close at a predetermined time after energization of the primary winding of the transformer. Contacts 254 control the energization of a relay coil 260, the forward contacts 261 of which are inserted in the line connecting the center tap of the secondary winding to ground. Therefore, voltage cannot be supplied by the transformer and rectifier tube to the terminal 255 until the contacts 254 are closed after a predetermined time delay.

The rectified A.C. voltage furnished by the tube 258 is filtered by choke 262, condenser 263 and load resistor 264. The output from the filter is applied to the output terminal 255 through a regulator tube 265 which is of a low mu, twin triode design intended for D.C. amplifier service. The two sections of the tube are connected in parallel to increase the current handling capacity of the tube. The grid bias of the tube 265 is determined by the voltage on the plate of a twin triode control tube 266. The voltage on the cathode of the left-hand section of the tube is stabilized by a voltage regulator tube 267 while the voltage on the grid of this section is determined by the voltage on the plate of the right-hand section of the tube. The cathode of the right-hand section is connected to a tap on a voltage divider connected in series between the output terminal 255 and ground, and the voltage on the grid of this section of the tube is maintained constant inasmuch as it is supplied from a tap on a voltage divider connected across the voltage regulator 267. Hence, any change in voltage at the output terminal 255 will result in a change of voltage on the cathode of the right-hand section of tube 266 thereby changing the bias on this section of the tube and varying the plate voltage which changes the bias on the left-hand section of the tube. This varies the voltage on the left-hand plate thereby adjusting the bias on the regulator tube 265 so as to increase or decrease the voltage drop across this tube and thereby restore the potential on the output terminal to the correct value.

The voltage regulator shown in FIG. 8 is of a similar character and includes a power transformer 270 having a center-tapped secondary winding which supplies A.C. voltage to the plates of three full-wave rectifier tubes 271. The heater of a thermostatic type delay relay 272 is connected in parallel with the primary winding of the transformer and controls the energization of a relay coil 273 which, when energized, closes relay contacts 274 connected between the center tap of the secondary winding and ground. Therefore, no voltage will be supplied to the terminal 256 until the coil 273 is energized after a predetermined interval following energization of the primary winding of the transformer.

The rectified output from the tubes 271 is filtered by choke 275, condenser 276 and resistor 277 and the filtered output is supplied to output terminal 256 through a plurality of parallel-connected regulator tubes 278. The voltage drop across tubes 278 is controlled by twin triode tube 279 in which the voltage on the cathode of the left-hand section and on the grid of the right-hand section are stabilized by the voltage regulator tube 280. The voltage regulator circuit including tubes 278, 279 and 280 operates in the same manner as the voltage regulator shown and described in FIG. 7 to control the voltage at the output terminal 256 and to maintain it constant under varying conditions of load.

*Alternating current generator*

To eliminate stray pickup and to provide fast response by the rotation control system of the tracer, the differential transformers 174, 195 and 196 (FIG. 6) of the tracing head are supplied with an energizing voltage of approximately 10,000 cycles per second provided by a local A.C. voltage generator. This generator, which, in the present embodiment, comprises a vacuum tube oscillator of the Wein-bridge type, illustrated in the upper left-hand corner of FIG. 10 of the drawings. The oscillator includes a twin triode type vacuum tube 285 the output from the left-hand section of which is inverted and amplified by the right-hand section of the tube. The output of the right-hand section is fed back to the input of the left-hand section of the tube through a coupling condenser 286. The feedback voltage is passed through a frequency discriminating network including series-connected condenser 287 and resistor 288, and parallel-connected resistor 289 and condenser 290. The values of these components are so chosen as to favor a frequency of 10,000 cycles per second and thereby cause the circuit to oscillate at that frequency. A degenerative feedback voltage is applied to the left-hand section of the tube 285 by a voltage divider consisting of the filament of a lamp 291, a resistor 292 and a variable resistor 293. The amount of negative feedback may be controlled by manipulation of the resistor 293 so as to maintain the amplitude of output from the left-hand section of the tube at a low enough level to insure that the wave form will be approximately sinusoidal. The 300 volt power supply of FIG. 7 provides a constant voltage source for operating the oscillator, the plates of the tube 285 being connected to the output terminal 255 of this power supply.

The 10,000 cycle voltage from the oscillator is taken from the cathode of the right-hand section of tube 285 and applied through a line 295 to the grid of the left-hand section of a twin triode vacuum tube 296 the plates of which are supplied from the supply terminal 255. The left-hand section of the tube 296 is connected in a cathode follower arrangement with the input of the right-hand section through a band pass filter to improve the wave form of the 10,000 cycle voltage. This filter includes series connected resistors 297 and capacitors 298, and parallel connected resistors 299 and capacitors 300 together with parallel connected inductances 301. The filter is designed to discriminate against frequencies above and below 10,000 cycles per second so as to furnish a pure 10,000 cycle signal to the grid of the right-hand section of tube 296. The right-hand section of the tube operates as a phase inverter, the signal being taken from the cathode and plate thereof and delivered through lines 303 and 304 and coupling condensers 305 and 306 to the grids of a push-pull amplifier tube 302.

*Rotation control circuit*

The plates of the tube 302 are supplied from the regulated voltage supply of FIG. 7 through a load resistor 308 and the center tap of a primary winding of transformer 307. The secondary winding of the transformer is connected in series with the primary winding 175 of the differential transformer or pickup 174 (FIG. 3) so as to energize this winding with 10,000 cycle voltage. As shown in FIG. 10, the secondary windings 176 of the transformer 174 are connected in phase opposition between ground and an output lead 309 which is connected through a coupling condenser 310 to the grid of an amplifier tube 311. If desired, the connection between secondary windings 176 may be connected to the slider of a potentiometer 312 connected across the outer ends of the windings so as to enable the balance point voltage of the transformer to be adjusted to a minimum value in a known manner.

When the tracing finger 40 is deflected sufficiently from the vertical position as shown in FIG. 3 to rock the lever 168 about its pivot 169 and elevate the core 177 of the transformer to its centered or null position, a zero signal will be delivered to the grid of tube 311. However, if the tracing finger 40 is underdeflected or overdeflected, a 10,000 cycle signal will be delivered to the tube through the output lead 309 due to the unbalance of the bucking voltages in the secondary windings 176. The phase of the error signal voltage will shift through 180 degrees at the null or balance point of the transformer due to the phase opposition of the voltages induced in the secondary windings 176. Hence the error signal produced by an overdeflection of the tracing finger will be 180 degrees out of phase with the error signal produced by an underdeflection of the finger. Also, the amplitude of the error signal will, by virtue of the linear characteristic of the transformer 174, be directly proportional to the extent of displacement of the finger from its position of normal displacement.

The 10,000 cycle error signal delivered to the grid of the tube 311 from the transformer 174 is amplified and delivered through a potentiometer 316 to a line 317 which is connected to the grid of a phase inverter tube 315 (FIG. 11). The plate and cathode of the tube 315 are connected through condensers 318 and 319, respectively, with the grids of a twin triode vacuum tube 320 whose plates are fed from the supply terminal 255 through the center-tapped primary winding of a transformer 321. The tube 320 is connected in a conventional push-pull arrangement and the amplified 10,000 cycle error signal appearing in the plate circuit of the tube is fed into a discriminator circuit which includes the center tapped secondary winding of the transformer 321 and a pair of series connected potentiometers 322 and 323 whose sliders are ganged for conjoint movement as indicated by dotted line 324. The potentiometers provide a sensitivity control, the sliders moving in unison toward the point of connection between the two potentiometer windings for the purpose of decreasing sensitivity, and toward the outer or "high" ends of the windings for increased sensitivity.

The phase of the error signal fed to the discriminator by the vacuum tube 320 is compared with the phase of the amplified signal from the Wien-bridge oscillator appearing on the bottom plate of the tube 302 (FIG. 10) which is fed through a line 325 into the center tap of the secondary winding of transformer 321 by a small coupling condenser 326 and a pair of voltage dividing resistors 327 and 328 connected between the condenser and ground which adjust the amplitude and phase of the reference voltage with respect to the phase and maximum amplitude of the error signal. The sliders of potentiometers 322 and 323 are directly coupled to the grids of a twin triode vacuum tube 330 in which bias is provided by a cathode biasing resistor and in which the plates are supplied with a source of positive voltage provided by the terminal 255 through suitable load resistors. Consequently, the voltage applied to one of the grids of the tube 330 will be the sum of the error signal voltage and the reference voltage from the signal generator while the voltage appearing on the other grid of the tube will be the difference of these voltages so that the two halves of the tube will conduct unequally when an error signal is present. Of course, if the differential transformer 174 is in its null position, the voltages on the grids of tube 330 will be equal so that both sections of the tube conduct equally.

The plates of tube 330 are connected by coupling condensers 331 and 332 to the plates of a twin diode tube 333 where the voltages from the two sections of the tube 330 are rectified and passed directly to the grids of a twin triode D.C. amplifier tube 334. The tube 334 is provided with a cathode biasing resistor 335 of substantial value and the grids of the tube are provided with a positive bias by a voltage divider comprised of resistors 336 and 337 connected in series between supply terminal 255 and ground, the grids being connected to the junction between the resistors through suitable grid resistors 338.

The plates of tube 334 are connected to the grids of a pair of D.C. power amplifier tubes 351 and 352 through a derivative damping network comprised of resistors 346, 347 and 348 and condensers 349 and 350. The plates of the tubes 351 and 352 are connected with the supply terminal 256 (FIG. 8) through a reversing switch 355, the energizing coils 239 (FIG. 5) of the clutches 215 and 216, normally open relay contacts 358—1 controlled by a relay 358 (FIG. 9), and a resistor 359. A source of stabilized D.C. voltage is provided for the screen grids of tubes 351 and 352 by means of a pair of series connected voltage regulator tubes 362 and 363, and the bias on tubes 351 and 352 may be adjusted by means of a rheostat 366 connected in series with a cathode biasing resistor 367 which is common to both tubes. When the machine is conditioned for hand servo control, the plates of tube 334 and the grids of tubes 351 and 352 are grounded by two pairs of normally closed contacts 358—2 and 358—3 controlled by the relay 358 (FIG. 9).

The derivative damping network comprised of resistors 346, 347 and 348, and condensers 349 and 350, operates as follows: When the tracing finger 40 is in its null position, both sections of twin triode tube 334 will conduct equally so that the voltages on the plates will be equal, the load resistors in the two plate circuits being of equal value. If now, the tracing finger undergoes a large deflection due to an abrupt change in the pattern outline, a potential difference will suddenly appear between the plates of the tube 334, one plate becoming more positive while the other plate becomes more negative. Which plates becomes more positive and which more negative depends, of course, on whether the tracing finger is overdeflected or underdeflected. The machine being under tracer control, the contacts 358—2 and 358—3 are now open and the resistors 346, 347 and 348 are effectively in series between the plates of tube 334 with the grids of tubes 351 and 352 connected across the resistor 347. The sudden voltage impulse developed between the plates of tube 334 will appear instantaneously across the resistor 347 due to the inability of condensers 349 and 350 to charge instantaneously. This will cause a large difference in potential to appear between the grids of tubes 351 and 352 and a correspondingly large difference in the amount of current flowing through the coils 239 of the clutches. Hence, a large torque will be applied by the clutches to the gear 140 to accelerate the tracing finger rapidly in whichever direction is necessary to reduce the deflection of the finger caused by the pattern. The condensers 349 and 350 will then charge and cause a voltage drop to occur across resistors 346 and 348 and reduce the voltage drop across resistor 347 and the voltage between the grids of tubes 351 and 352. This reduces the difference in current flow between the coils 239 and causes a corresponding reduction in the torque on gear 140. After a sufficient period of time, depending upon the time constant of the charging circuits of the condensers 349 and 350, the voltage between the plates will divide normally among the three resistors and the torque on gear 140 will become constant. It will be appreciated, of course, that when zero error signal is present, the tubes 351 and 352 will conduct equally so that the magnetic clutches 215 and 216 (FIG. 5) will be in balance and no rotation of gear 140 will occur.

The purpose of contacts 358—1 (FIG. 11) is to break the plate circuit of tubes 351 and 352 when the relay 358 (FIG. 9) is de-energized and thereby deactivate the clutches 215 and 216 so that the ring 131 (FIG. 3) can be turned by hand. At the same time, the contacts 358—2 and 358—3 will be closed thereby grounding the grids of tubes 351 and 352 so as to prevent excessive screen current from flowing through the tubes while the plates are cut off.

The control apparatus just described for effecting rotation of the tracing finger in response to an error signal created by overdeflection or underdeflection of the finger may appropriately be referred to as the rotation control since it functions to maintain the direction of eccentricity of the tracing finger tangent to the contour of the pattern. By means which will now be described, the relative movement of the table and cross-slide is controlled by the angular position of the tracing finger so as to cause the finger to move relative to the pattern, and the cutter to move relative to the workpiece, in the direction of the eccentricity of the tracing finger. The basic direction of tracing may be reversed by operating the reversing switch 355 mounted on the front of the head 39 (FIG. 1), which reverses the direction of correction applied to the tracing finger by the magnetic clutches.

*Table control circuit*

As was mentioned earlier in the description, a pair of sine-cosine transformers or pickups 195 and 196 is arranged in the tracing head 39 for co-operation with the contour of a sine-cosine cam 199 fashioned on the upper face of the gear 140. The transformer or pickup 196 controls the movement of the table 21 of the machine while the transformer or pickup 195 controls the movement of the cross-slide 23.

Referring to FIG. 10, a potentiometer 375 is connected in the cathode circuit of the right-hand section of tube 296. The slider of this potentiometer is connected through a condenser 376 with the grid of a throttle tube 377. The arrangement and functioning of this tube in the circuit will be fully described at a later point in this specification and for the present it will be sufficient to state that the plate of the tube is connected by a condenser 378 to ground through a potentiometer 379 whose slider is connected with the grid of a phase inverter tube 380. The plate and cathode of this tube are connected through coupling condensers with the grids of a push-pull amplifier tube 381 whose plates are fed from the supply terminal 255 through a dropping resistor and a center tap on the primary winding of a transformer 382. Hence, the 10,000 cycle voltage generated by the Wien-bridge oscillator will be delivered to the secondary winding of transformer 382 one end of which is connected to ground and the other end of which is connected by a line 383 (FIG. 12) to one end of the primary winding 384 of the differential transformer 196. The other end of the primary winding is connected to ground so that a 10,000 cycle energizing voltage will be supplied to the primary winding of the transformer. The transformer 196 is provided with a magnetic core 385 and with a pair of secondary windings 386 connected in phase opposition in the same manner as the cross-slide transformer 195 (FIG. 5). One end of the combined secondary windings 386 is connected to ground while the other end is connected to ground through a potentiometer 388. The slider of potentiometer 388 is connected to the grid of a phase inverter tube 389 the plate and cathode of which are connected to the grids of a push-pull amplifier tube 390 through suitable coupling condensers. The plates of the tube 390 are fed from the supply terminal 255 through a center tap on the primary winding of a transformer 391. The center tapped secondary winding of the transformer 391 is connected in push-pull with the grids of a discriminator tube 392 whose plates are tied directly to the supply terminal 255. The phase of the 10,000 cycle voltage delivered by the differential transformer 196 and appearing in the secondary winding of transformer 391 is compared with the phase of a reference voltage of the same frequency in the input circuit of discriminator tube 392. This reference voltage is derived from a line 393 connected to one plate of amplifier tube 381 (FIG. 10) and is applied to the center tap of the secondary winding of transformer 391 (FIG. 12) by a coupling condenser 394 which, together with a resistor 399, suitably adjust the amplitude and phase of the reference voltage with respect to the maximum amplitude and phase of the control voltage. The grid and cathode of each section of tube 392 is operated well above ground potential by means of a pair of resistors 395 and 396 which are of considerably greater ohmic resistance than the biasing resistors 397 and 398 of the tube. Discriminator tube 392 operates in essentially the same manner as the previously described discriminator 330 (FIG. 11) to cause one section of the tube 392 to conduct more heavily than the other depending on the phase of the voltage delivered to the transformer 391 by the differential transformer 196. If the magnetic core 395 of the transformer is in its centered or null position, no signal will be delivered thereby to the transformer 391 and the two sections of tube 392 will conduct equally.

The cathodes of tube 392 are coupled by condensers to the plates of a rectifier tube 402 the cathodes of which are coupled directly to the grids of a D.C. push-pull amplifier tube 403. The grids and cathodes of the tube 403 are balanced to ground by suitable resistors and a source of A.C. dither voltage 404 is introduced onto the cathode of the tube by a transformer 405 whose primary winding is connected to the source 404 and whose secondary winding is connected to the cathodes of the tube. The frequency of the voltage source 404 may be as desired and in the case of the present apparatus is derived from a 110 volt, 60 cycle source.

The plates of the D.C. amplifier tube 403 are fed from the supply terminal 256 through a balancing potentiometer 408 and a pair of suitable load resistors. The output of tube 403 is fed to a D.C. power amplifier 406. For this purpose, the plates of tube 403 are directly coupled to the grids of D.C. power amplifier tubes 409 and 410 and also to the grids of parallel connected tubes 411 and 412, which are of the same type as tubes 409 and 410. The plates of the power amplifier tubes are fed directly from the regulated voltage supply terminal 256 while the screen grids of the tubes are connected to the supply through suitable voltage dropping resistors. The cathodes of the tubes are connected to ground through biasing resistors 413 and 414 and are adapted to provide energizing current for a solenoid 415 one end of which is connected to the cathodes of tubes 409 and 411 and the other end of which is connected to the cathodes of tubes 410 and 412 as shown in FIG. 12. Consequently, when the output voltage from the differential transformer 196 is zero, equal currents will flow through the two pairs of tubes 409, 411 and 410, 412 and zero current will flow through the coil 415 since the resistances of 413 and 414 are equal. However, when a signal is supplied to the circuit from transformer 196, a current will flow through coil 415 in one direction or the other depending on the direction of displacement of the core 385 of the transformer from its centered or null position.

Cross-slide control circuit

The cross-slide 23 of the machine shown in FIG. 1 is controlled by a circuit which is similar to the circuit just described in connection with the table 21. As shown in FIG. 10, the plate of throttle tube 377 is connected by a line 420 with the grid of a phase inverter tube 421 the plate and cathode of which are connected to the grids of a push-pull amplifier tube 422 by suitable coupling condensers. The plates of the tube 422 are fed from the supply terminal 255 through a dropping resistor and a center tap on the primary winding of a transformer 423. The secondary winding of the transformer has one end connected to ground and the other end connected to a line 424 which, as shown in FIG. 13, is connected to one end of the primary winding 205 of differential transformer 195, the other end of which winding is connected to ground. The primary winding of the transformer is thereby supplied with a source of 10,000 cycle energizing voltage from the Wien-bridge oscillator. The secondary windings 206 of the transformer are as hereinbefore stated connected in phase opposition between ground and an output line 425 which is connected to ground through a potentiometer winding 426. The slider of the potentiometer is connected to the grid of a phase inverter tube 427 the plate and cathode of which are connected by coupling condensers with the grids of a push-pull amplifier tube 428. The plates of the tube 428 are fed from the supply terminal 255 through the center tap of a primary winding of a transformer 429 having a secondary winding the ends of which are connected to the grids of a discriminator tube 430. A 10,000 cycle reference voltage is delivered to the center tap of the secondary winding of transformer 429 through a coupling condenser 431 and a line 432 (FIG. 10) which is connected to one of the plates of the amplifier tube 422. The discriminator tube 430 is arranged and functions in the same manner as the discriminator tube 392 (FIG. 12) of the table control circuit so as to cause one section of the tube to conduct a larger signal than the other section depending on the phase of the voltage delivered to the transformer 429 by the differential transformer 195.

The plates of the tube 430 are connected through coupling condensers to the plates of a rectifier tube 435 the cathodes of which are connected directly to the grids of a D.C. push-pull amplifier tube 436. The grids and cathodes of the tube 436 are balanced to ground through suitable resistors provided for this purpose and a source of A.C. dither voltage 437 is applied to the cathodes of the tube through a coupling transformer 438. The plates of the tube 436 are fed from the supply terminal 256 through a balancing potentiometer 439 and suitable load resistors. The output of tube 436 is fed to a D.C. power amplifier 434, the plates of the tube 436 being directly coupled to the grids of D.C. power amplifier tubes 440 and 441 and to the grids of parallel connected power amplifier tubes 442 and 443. The plates of the power amplifier tubes are connected directly to the supply terminal 256 while the cathodes thereof are connected to ground through biasing resistors 444 and 445 of equal value. The power amplifier tubes serve to energize a solenoid 446 one end of which is connected to the cathodes of the tubes 440 and 442 and the other end of which is connected to the cathode of tubes 441 and 443.

As in the case of the table control circuit, when the magnetic core 209 of the differential transformer 195 is in its centered or null position, a zero signal will be delivered to the circuit and the solenoid 446 will remain unenergized. When, however, a voltage is produced in the output line 425 of the differential transformer, a current will flow through the coil 446 in one direction or the other depending on the phase of the voltage delivered by the transformer 195.

It will be noted that inasmuch as the differential transformers 195 and 196 each have a linear characteristic, and since the table control circuit and the cross-slide control circuit each is designed to preserve the linear relation of the output voltage from its related transformer all the way through to the solenoids 415 (FIG. 12) or 446 (FIG. 13), the amount of current flowing through each of these coils will be proportional to the extent of displacement of the magnetic core of its associated differential transformer thereby maintaining a sine-cosine relation between the currents in the solenoids in response to the sine-cosine relationship between the displacements of the magnetic cores of the differential transformers 195 and 196.

Hydraulic tracer control

As indicated diagrammatically in FIG. 2 and as shown in greater detail in FIG. 15, the solenoids 415 and 446 control the operation of servo motors 451 and 452, respectively, which in turn control the displacement of variable displacement pumps 453 and 454, respectively. Considering first the mechanism for controlling the movement of the table 21, it will be observed that a polarized armature 455 associated with solenoid 415 is connected to the upper end of plunger 456 of servovalve 457. This valve is mounted on a subframe 458 which is preferably secured to the main frame of the machine tool. The plunger 456 works in a follow up sleeve 459 which in turn is slidable within the valve body and is ported to co-operate with the lands on the plunger 456 to valve the hydraulic fluid to and from a power cylinder 460. The cylinder contains a piston 461 mounted on the end of a piston rod 462 which is pivotally connected to the yoke 463 of the variable displacement pump 453 for the table. The follow up sleeve 459 is connected by a link 464 to an arm 465 fulcrumed at 466 on the frame 458. At its opposite end, the arm 465 is slotted to receive a headed pin 467 mounted on the piston rod 462.

Referring to FIG. 2 of the drawings, a source of fluid under pressure is provided for actuating the power cylinder 460 by a reducing valve 470 which receives high pressure fluid from the high pressure line 67 and supplies it at reduced pressure to a supply line 471 which is connected to the center port of valve 457 (FIG. 15). The drain ports of the valve are connected to the drain line 81 of the system and the motor ports are connected by lines 472 and 473 to the ends of cylinder 460.

When the solenoid 415 is energized by a flow of current therethrough in one direction, the plunger 455 will be raised thereby raising the plunger 456 of the servovalve to cause fluid under pressure to flow through line 473 into the lower end of cylinder 460 and raise the piston and rotate the pump control arm 463 clockwise. Upward movement of the piston rod 462 will raise the follow up sleeve 459 thereby centering the valve plunger with respect to the sleeve and cutting off the flow of oil through the line 473. Conversely, when the current flow through the solenoid 415 is in the opposite direction, the plunger 455 will be depressed thereby lowering the valve plunger thus causing fluid under pressure to be delivered to the upper end of the cylinder 460 through line 472. This will move the piston downward and rock the yoke 463 counterclockwise and lower the follow up sleeve 459 to cut off the flow of oil to the cylinder and prevent further movement of the piston until further movement of the valve plunger in either direction is effected whereupon the piston 461 will again follow the valve plunger in its movements. Hence, there is provided a servo mechanism for operating the yoke 463 of the variable displacement pump 453 in accordance with the flow of current through the solenoid 415. In order to maintain the linearity of the system, the solenoid must also have a linear response so that movement of the valve plunger will at all times be proportional to the amount of current flowing through the coil 415.

The servo motor 452 for the cross-slide pump 454 is similar to the servo motor 451 and includes a polarized solenoid plunger 475, a valve plunger 476, a servovalve 477, a follow up sleeve 478, a power cylinder 479, a piston 480 working in the cylinder and operating a piston rod 481 connected to the yoke 482 of the variable displacement pump 454 for the cross-slide, a link 483 connected to an arm 484 fulcrumed at 485 and connected to the piston rod 481 by headed stud 486. Pressure fluid is supplied to the center port of the valve 477 through pressure line 471 and the end ports of the valve are connected to the drain line 81 of the system. The motor ports of the valve are connected by lines 487 and 488 to the upper and lower ends, respectively, of the cylinder 479. The servo mechanism for the cross-slide operates in the same manner as that for the table to adjust the yoke 482 for the cross-slide pump 454 in accordance with the amount of current flowing through the solenoid 446 and in a direction corresponding to the direction of flow of current through the coil.

The variable displacement pump 453 for operating the table 21 of the machine tool operates as a closed system with the hydraulic cylinder 55 (FIG. 2) which, as heretofore explained, actuates the table 21. The fluid delivery lines 495 and 496 of the pump are connected to ports on selector valve 73 which, when this valve is set for tracer operation, are connected to motor lines 77 and 79 while the servovalve lines 78 and 80 will be disconnected from the cylinder so as to render the hand servovalve 70 ineffective.

In a similar manner, the variable displacement pump 454 for the cross-slide is connected by delivery lines 497 and 498 with additional ports on the selector valve 73 so as to cause this pump to be connected to the cylinder 58 for the cross-slide through lines 82 and 84 when the valve is set for tracer operation. At the same time, the lines 83 and 85 from the hand servovalve 71 will be disconnected from the cylinder so as to disable the valve and prevent hand operation of the cross-slide.

The system is protected against overloads by a relief valve 500 and check valves 501, 502, 503 and 504 in the case of the pump 453, and a pressure relief valve 505 and check valves 506, 507, 508 and 509 in the case of the pump 454. In the arrangement shown, these valves will by-pass fluid from one side of the pump to the other if the pressure in the delivery lines exceeds the pressure setting of the relief valve.

Provision is made for replenishing any fluid loss from each of the pump and cylinder systems due to leakage so that positive actuation of the table and cross-slide will be assured. For this purpose, the pressure supply line 471 is connected through opposed check valves 512 and 513 with the delivery lines 495 and 496, respectively, and by similarly arranged check valves 514 and 515 with the delivery lines 497 and 498. Hence, make-up oil will be delivered from the pressure line 471 to the low pressure side of the pump in whatever quantity is needed to maintain the system filled with fluid. At the same time, the check valves will operate to prevent fluid from the high pressure side of the pump from entering the pressure line 471.

The pumps 453 and 454 are arranged to be driven at varying speeds by power supplied by an electric motor 520 (FIG. 15) which drives the input shaft 521 of a variable speed drive 522 which may be adjusted by handwheel 519. This drive may be of any desired type which will provide a suitable range of speed variation between the input shaft 521 and an output shaft 523 which drives shafts 524 and 525 of the pumps 453 and 454, respectively, through gears 526 and 527 mounted on the pump shafts and meshing with a gear 528 secured to the output shaft 523. By this means the feed rate of the cutter relative to the workpiece and of the tracing finger relative to the pattern may be controlled as desired by adjusting the speed ratio between the input shaft 521 and the output shaft 523 of the drive 522 by means of handwheel 519. It is thereby possible to utilize a sine-cosine cam such as the cam 199 (FIG. 5) of fixed displacement so that the sine-cosine voltages produced by the transformers 195 and 196 are always of the same magnitude regardless of the feed rate employed. This system has a further advantage in that the throw of the yokes 463 and 482 (FIG. 15) of the pumps remains the same for all feed rates thereby eliminating inaccuracies in the operation of the tracer control system which would be introduced by attempting to operate the pumps very close to their positions of zero displacement in order to obtain low feed rates.

*Throttling control circuit*

The tracer control mechanism hereinbefore described is provided with means for reducing the feed rate of the cutter relative to the workpiece and of the tracing finger relative to the pattern when abrupt changes in the pattern outline are sensed by the tracing finger 40 so as to provide time for the tracing finger to rotate and signal a change of direction to the table and cross-slide through the sine-cosine transformers. In this way, the feed rate of the machine tool will automatically be adjusted in the manner necessary to permit accurate reproduction of abrupt corners occurring in the pattern or master being traced.

Referring to FIG. 10 of the drawings, the tube 311 which amplifies the error signal produced by the transformer 174 in response to deviations of the tracing finger from its position of normal displacement, has connected to its plate one end of a potentiometer winding 535 the other end of which is connected to ground. The slider of this potentiometer is connected to the grid of a phase inverter tube 536 the plate and cathode of which are suitably coupled to the grids of a push-pull amplifier tube 537. The plates of this tube are fed from the supply terminal 255 through the center tap of the primary winding of a transformer 538. The center tap of the secondary winding of the transformer 538 is maintained at a predetermined potential with respect to ground by a voltage divider including resistors 539 and 540. The plates of a full-wave rectifier tube 541 are connected to the end terminals of the secondary winding of transformer 538 while the cathodes of the tube 541 are tied together and connected to the center tap of the secondary winding through a resistance-capacitance filter network and a load resistor 542 connected to a line 543 which is joined to the center tap.

When the machine tool is set for hand servo operation, the line 543 is connected with the grid of a bias tube 544 through a pair of normally closed relay contacts 341—1 which are associated with a relay 341 (FIG. 10). This relay also controls a pair of normally open contacts 341—2 which are connected across the load resistor 542. When the relay 341 is energized, the contacts 341—1 will open and the contacts 341—2 will close thereby connecting the grid of bias tube 544 to the upper end of load resistor 542 in place of to the line 453.

The cathode of tube 544 is connected through a biasing resistor 547 to ground and through a line 548 to the cathode of throttle tube 377, the grid of which is maintained at predetermined potential by a voltage divider comprised of resistors 549 and 550 connected between the supply terminal 255 and ground. The screen grid of the throttle tube is held at a constant potential by means of a voltage regulator tube 551 which is energized from the supply terminal through a voltage dropping resistor 552.

When the machine tool is set for automatic tracer control, the contacts 341—1 will be open and the contacts 341—2 will be closed thereby connecting the grid of bias tube 544 to the output of rectifier tube 541. Under these conditions, when the tracing finger 40 is deflected due to a change in direction in the pattern outline, the error signal produced by the transformer 174 and amplified by tube 537 and rectified by tube 541 will cause a voltage drop to occur across the load resistor 542 with the upper end of the resistor positive with respect to the lead 543. The size of this voltage drop will be proportional to the magnitude of the error signal. This will cause an increase in current flow through the bias tube 544 and cause the cathode of this tube and also the cathode of throttle tube 377 to become more positive. This increases the negative bias on throttle tube 377 thereby reducing the amplitude of the 10,000 cycle energizing voltage delivered to the primary windings of the sine-cosine differential transformers 195 and 196 in proportion to the magnitude of the error signal. Hence, the output voltages of the transformers will be correspondingly reduced thereby reducing the displacement of the pumps 453 and 454 which operate the table and cross-slide of the machine.

*Machine controls*

Referring to FIG. 9, it will be seen that power is provided for the control circuit of the tracing apparatus by the secondary winding of a power transformer 562, the primary winding of which is adapted to be energized from the power line. The lines 565 and 566 which are connected to the secondary winding will thereby be energized and cause the solenoid 567 of valve 107 (FIG. 2) to be energized through a normally open limit switch 568, mounted in the tracing head, which is normally held closed by an adjusting screw 569 (FIG. 3) mounted in the right-hand end of the lever 168. As previously explained, when the solenoid valve 107 is energized, the line 106 (FIG. 2) is connected to drain thereby permitting the half nut 101 to engage the feed screw 100 so as to place the tool head under hand servo control. However, in the event of overdeflection of the tracing finger 40 to a point where damage to the machine might occur, the adjustment screw 569 will permit the contacts of switch 568 to open thereby de-energizing solenoid valve 107 and connecting line 106 to the high-pressure supply line 67 of the hydraulic system. This will remove the half nut 101 from the feed screw and allow spring 103 (FIG. 2) to move the plunger of valve 72 upwardly thereby supplying fluid under pressure through line 86 to the upper end of cylinder 61 so as to elevate the tool head and lift the cutter and tracing finger away from the workpiece and pattern. After the overdeflected condition of the tracing finger has been eliminated, the switch 568 will again be closed to energize solenoid valve 107 and re-engage the half nut 101 thereby enabling the head to be moved down under hand servo control.

Referring to FIG. 10 it will be seen that the coil of relay 341 is connected in the plate circuit of a triode vacuum tube 571 which controls the energization of relay 341. The grid of tube 571 is connected by a resistor 572 to the plates of a full-wave rectifier tube 573 and by a second resistor 574 to ground. The resistors 572 and 574 form a load circuit for the tube 573, the cathodes of which are connected to the end terminals of the secondary winding of transformer 538.

When the tracing finger is hanging free, a high level error signal is produced by the differential transformer 174 which is amplified by the tube 537 and rectified by the tube 573 whose cathodes are connected to ground through resistors 575 and 576. A negative voltage will thereby be developed across the resistor 574 which will apply a negative bias to the grid of tube 571 and prevent energization of the coil of relay 341. However, as soon as the tracing finger is deflected toward its null position, the error signal will be diminished thereby reducing the negative bias on the grid of tube 571 to a point where sufficient current will be conducted by the tube to energize relay 341. This will cause contacts 341—3 of the relay to close thereby locking the relay through a normally closed push button switch 50, mounted on the tracing head 39 (FIG. 1), and the voltage dropping resistor 577. It will be noted that one of these contacts is connected to ground while the other is connected to a junction 560 which in turn is connected to one terminal of switch 50. The junction 560 is also connected to one end of the winding of relay 358 (FIG. 9). Hence, the contacts 341—3 will close a circuit through the coil of relay 358 (FIG. 9) to ground and energize this relay. This will cause the previously mentioned contacts 358—2 and 358—3 (FIG. 11) of this relay to open and the contacts 358—1 thereof to close. At the same time, a further set of contacts 358—4 controlled by this relay will be closed thereby energizing the solenoid 579 of a solenoid valve 580 (see also FIG. 2). When the valve 580 is energized, fluid will be delivered under pressure through line 581 behind the plunger 74 of the selector valve 73 so as to shift the valve from hand servo control position to tracer control position, the chamber at the end of plunger 75 being connected to drain through a line 582 connected to a port on a hydraulic "push button" valve 583 having an operating button 584 (see also FIG. 1). The table and cross-slide will now be placed under the control of the variable displacement pumps of the tracer control system and control of these elements by the hand servo valves 70 and 71 will be disabled. The machine will continue to operate under tracer control until switch 50 is held depressed while the tracing finger is manually steered away from the pattern by grasping the knurled ring 131 (FIG. 3) and turning it forcibly away from the pattern. The finger will now hang free and cause a larger error signal to be produced which will bias the grid of tube 571 negative and de-energize relay 341. This will cause contacts 341—3 (FIG. 9) to open thereby dropping out relay 358. Contacts 358—4 will thus be opened to de-energize solenoid valve 580 and connect line 581 to drain. Contacts 358—1 (FIG. 11) will be opened and the machine may now be steered by simply turning the knurled ring 131 in the direction desired.

If the operator wishes to restore the machine to hand servo control, the hydraulic push button 584 is depressed so as to connect the line 582 to the pressure line 67 and shift the selector valve 73 to the "Hand" position. It will be noted that whatever the condition of the machine, when the tracing finger is deflected toward its null position with the switch 50 in its undepressed position, the relay 341 will pull in and cause the machine to be set for full automatic tracing.

To facilitate setting up the machine for tracer operation, it is desirable to lock the tracing finger 40 in its vertical position as shown in FIG. 3 and for this purpose a knurled head 586 is provided on the upper end of the threaded sleeve 186 to permit the sleeve to be turned downwardly until its lower end abuts against the upper edge of lever 168 and locks it against upward movement. This will hold the finger against displacement until the sleeve is backed off by reverse rotation thereof by the operator of the machine. To safeguard the mechanism against damage should the operator forget to return the sleeve 186 to the position shown in FIG. 3 where the lever 168 is free to move upwardly under the control of the finger to control operation of the machine in the intended manner, a limit switch 564 is placed in the tracing head so that the normally closed contacts of the switch will be opened when the sleeve 186 is turned down to lock the finger. As shown in FIG. 5, the switch 564 is mounted on the body 171 immediately beneath a flange 587 formed on the upper end of sleeve 186. The operating button of the switch lies in contact with the bottom surface of the flange and will be depressed thereby when the sleeve is screwed down into the block so as to open the contacts of the switch. The switch 564 is preferably located in the control circuit of the pump driving motors 64 (FIG. 2) and 520 (FIG. 15) so as to disable the motors while the switch is open and thereby prevent operation of the machine while the tracing finger is locked.

*Operation*

The tracer controlled machine tool heretofore described operates as follows:

The workpiece 28 and pattern 41 (FIG. 1) are mounted on the table 21 of the milling machine as shown after which the tracing finger 40 is so adjusted with relation to the cutter 27 as to occupy the same relative position with respect to the pattern 41 that the cutter occupies with respect to the workpiece 28, it being assumed that the workpiece corresponds generally to the shape of the pattern 41. To set the machine into operation, the operator may feed the tracing finger 40 against the pattern by manipulation of hand wheels 45 and 46 thereby causing the differential transformer 174 (FIG. 3) to approach its null position. This will decrease the bias on relay tube 571 (FIG. 10) and cause relay 341 to pull in and close contacts 341—3 (see also FIG. 9) so as to lock in the relay and energize relay 358. The latter relay, when energized, closes contacts 358—4 and energizes solenoid valve 580 (FIG. 2) so as to shift selector valve 73 from "Hand" position to "Tracer" position. As heretofore explained this will cause the table and cross-slide cylinders 55 and 58, respectively, to be connected in a closed system with the variable displacement pumps 453 and 454 and render ineffective the control of the cylinders by hand servo valves 70 and 71. Energization of the relay 358 also causes contacts 358—2 and 358—3 (FIG. 11) to open, and contacts 358—1 in the plate circuit of power amplifier tubes 351 and 352 to close, thereby conditioning the rotation control circuits for operation.

An alternative method of engaging the finger with the pattern is to manually deflect the tracing finger so as to condition the machine for full automatic tracing, and then release the finger with the switch 50 depressed. This will cause the relays 341 and 358 to drop out, as previously explained, but will allow the selector valve 73 to remain in "Tracer" position. The finger may now be steered into contact with the edge of the pattern by suitable manipulation of knurled ring 131. As soon as the finger is deflected by the pattern, it will cause the relays to pull in and thereby condition the machine for full automatic tracing.

Referring to the block diagram of the tracer control system shown in FIG. 14, as herein indicated the templet 41 acts on the tracer finger 40 to deflect it from its vertical or free position as shown in FIG. 3. The tracing finger controls the rotation transformer or pickup 174 to which is fed an energizing voltage produced by the oscillator and filter 284. As heretofore explained, this voltage is applied to the primary winding of the transformer and an error signal is produced on the output terminal of the secondary windings whenever the tracing finger is over-deflected or underdeflected from its normal or null position. The error signal is amplified by tube 311 (FIG. 10) and push-pull amplifier tube 320 (FIG. 11) after which it is passed to the discriminating circuit including tube 330 for the purpose of ascertaining the phase of the error signal. The discriminated signal is then rectified by tube 333 and amplified by D.C. amplifier 334 to provide a D.C. signal the sign of which corresponds to the phase of the error signal. This signal is applied to the grids of a push-pull D.C. power amplifier comprised of tubes 351 and 352 (see also FIG. 14) which controls the energization of the pair of magnetic clutches 215, 216 which together control rotation of the tracing finger in a direction to reduce the error signal by virtue of the eccentricity of the tracing finger. At the same time the sine-cosine cam 199 is turned so as to readjust the armatures of the sine-cosine pickups 195 and 196 and thereby alter the relative movements of the table and cross-slide in such a manner as to change the directional heading of the cutter and tracing finger to correspond with the adjusted position of the finger.

As indicated in the block diagram, energization of the pickups is effected by a voltage derived from the oscillator and filter unit 284 which is controlled by throttle tube 377 and passed through preamplifiers including tubes 381 and 422 (FIG. 10). The voltage outputs from the secondary windings of the pickups 195 and 196 which, as heretofore explained bear a sine-cosine relationship to one another, are then passed to amplifying and discriminating circuits which, in the case of the table, includes twin-triode vacuum tubes 390 and 392 and rectifier tube 402, and, in the case of the cross-slide, includes twin-triode vacuum tubes 428 and 430 and rectifier tube 435. The resulting D.C. sine-cosine voltages are then applied to push-pull D.C. power amplifiers 406 and 434 for the table and cross-slide, respectively, which in turn control the energization of solenoids 415 and 446 to thereby control the displacements of the variable displacement pumps 453 and 454 which operate the table 21 and cross-slide 23. The rate and direction of feed of the table and cross-slide are maintained in a true sine-cosine relationship by virtue of the linearity of the control circuits, servo motors and pumps which, together, operate to transform the displacements of the pickups into corresponding movement of the table and cross-slide.

As the tracing finger 40 proceeds along the edge of the pattern 41, the cutter 27 will machine the workpiece 28 to conform to the contour of the pattern. In the event that an abrupt change occurs in the outline of the pattern, the tracing finger 40, when it encounters this portion of the pattern, will undergo a large deflection which will produce a large error signal. This signal, which is derived from the output of vacuum tube 311 (FIG. 10), is applied to a throttle control circuit including phase inverter tube 536, push-pull amplifier tube 537, rectifier tube 541 and bias control tube 544 so as to apply a bias to the throttle tube 377 and reduce the amplitude of the energizing voltage applied to the primary windings of the table and cross-slide pickups 196 and 195. This will, of course, reduce the magnitude of the energizing voltage applied to the table and cross-slide solenoids 415 and 446 and thereby reduce the throw of the pumps and the speed of the table and cross-slide.

The feed rate of the cutting tool 27 relative to the workpiece 28 and of the tracing finger 40 relative to the pattern 41 may be adjusted to suit the requirements of the job at hand by manipulation of the handwheel 519 (FIGS. 1 and 15) whereby the ratio of the variable speed drive 522 may be adjusted so as to control the speed of the variable displacement pumps 453 and 454. In this way the feed rate of the table and cross-slide may be increased or decreased as the speed of the pumps is increased or decreased. As heretofore pointed out, this method of controlling the feed rate of the machine has the important advantage that the system will operate with the same accuracy at low feed rates as it does at high feed rates from the standpoint of the accuracy of the pickups, servos and pumps.

After the workpiece 28 has been completely machined and it is desired to replace it with a new workpiece, the tracer may be steered away from the pattern by manual rotation of ring 131 to turn the tracing finger away from the pattern while simultaneously depressing the switch 50 after which the finger may be released and permitted to hang free in its vertical position. As heretofore explained, this will cause the relay 341 (FIG. 10) to drop out since the holding circuit provided therefor by the switch 50 and contacts 341—3 of the relay will be broken. Opening of contacts 341—3 will cause relay 358 (FIG. 9) to drop out thereby opening contacts 358—4 so as to de-energize solenoid valve 580 and connect line 581 (FIG. 2) to drain. The table and cross-slide will thereby be conditioned for manual steering by knurled ring 131. The machine may be returned to hand servo control by depressing hydraulic push button 584 so as to shift selector valve 73 to "Hand" position. The machine is now ready for the insertion of a new workpiece after which the tracing finger may again be fed into the pattern by manipulation of the handwheels 45 and 46 until the deflection of the finger has sufficiently approached the null position to cause the relay 341 (FIG. 10) to pull in and again condition the machine for full automatic tracer operation.

While the present invention has been described with reference to one particular form or embodiment thereof and there has been used, therefore, certain specific terms and language herein, it is to be understood that the present disclosure is illustrative rather than restrictive and that changes and modifications may be resorted to without departing from the spirit or the scope of the claims which follow.

We claim:
1. In a system for controlling a pair of transversely movable elements for effecting 360° relative movement between a tracer and a pattern carried thereby, the combination of a pair of reversible fluid motors for driving said elements, a tracing finger mounted on said tracer for rotation about its longitudinal axis and for pivotal movement by said pattern about a transverse axis, said finger being pivotally movable by said pattern from an underflected position through a position of normal deflection to an overdeflected position, means for producing an electric signal of one character when said finger is underdeflected by said pattern and for producing an electric signal of another character when said finger is overdeflected by said pattern, means controlled by said signal for turning said finger about its longitudinal axis in one direction or the other depending on the character of said signal, a device for producing a pair of voltages bearing a sine and cosine relationship respectively, to the rotational position of said finger about its longitudinal axis, and means actuated by said pair of voltages for controlling the operation of said fluid motors to cause said tracer to move in such a direction relative to said pattern as to restore the tracing finger to its position of normal deflection.

2. In a system for controlling a pair of transversely movable elements for effecting 360° relative movement between a tracer and a pattern carried thereby, the invention comprising individual hydraulic motors for moving said elements, means for controlling the operation of said motors so as to cause said elements to be moved in either direction at varying speeds, said means including a pair of electric signal producing elements and a pair of servo valves controlled thereby, a source of energizing voltage for said elements, means for producing an error signal whenever said tracer deviates from the pattern outline, and means for causing the magnitude of the energizing voltage to vary inversely as the magnitude of the error signal to thereby reduce the level of the signals produced by said elements and the speed of the tracer relative to the pattern as the error signal increases.

3. The control system of claim 2 wherein said controlling means includes a rotatable device, means for causing the electric signals produced by said pair of elements to vary in accordance with the angular position of said device to thereby adjust the directional heading of the tracer relative to the pattern, and means controlled by said error signal for adjusting the angular position of said device to change the directional heading of the tracer relative to the pattern and reduce the error signal.

References Cited in the file of this patent
UNITED STATES PATENTS
2,814,239   Lavieri et al. _____ Nov. 26, 1957